United States Patent
Nelson et al.

[11] Patent Number: 6,130,981
[45] Date of Patent: Oct. 10, 2000

[54] GAMMA RADIATION STERILIZED FIBER OPTIC UV DELIVERY SYSTEMS

[75] Inventors: Gary Nelson, Glendale, Ariz.; Karl-Friedrich Klein, Friedberg, Germany

[73] Assignee: Polymicro Technologies, LLC, Phoenix, Ariz.

[21] Appl. No.: 09/044,907

[22] Filed: Mar. 20, 1998

[51] Int. Cl.[7] .............................. G02B 6/02; B05D 5/06
[52] U.S. Cl. .................... 385/128; 385/127; 385/123; 385/141; 427/163.1; 427/163.2; 427/595; 427/596; 427/597
[58] Field of Search ................................ 385/123, 127, 385/128, 141, 144; 427/163.1, 163.2, 595, 596, 597

[56] References Cited

U.S. PATENT DOCUMENTS

| | | | |
|---|---|---|---|
| 3,611,188 | 10/1971 | Snitzer | 252/301.4 |
| 4,075,493 | 2/1978 | Wickersheim | 250/461 R |
| 4,407,561 | 10/1983 | Wysocki et al. | 385/128 X |
| 4,415,810 | 11/1983 | Brown, Sr. | 250/484.1 |
| 4,626,068 | 12/1986 | Caldwell | 385/128 X |

OTHER PUBLICATIONS

E.J. Friebele et al., Effect of ionizing radiation on the optical attenuation in doped silica and plastic fiber–optic waveguides, Applied Physics Letters, American Institute of Physics, May 15, 1978, vol. 32, No. 10 pp. 619–621.

E. J. Friebele et al., Compositional effects on the radiation response of Ge–doped silica–core optical fiber waveguides, Applied Optics, Sep. 1, 1980, vol. 19, No. 17, pp. 2910–2916.

E.J. Friebele et al., Photobleaching effects in optical fiber waveguides, Applied Optics, Oct. 1, 1981, vol. 20, No. 19, pp. 3448–3452.

E. J. Friebele et al., Radiation damage of optical fiber waveguides at long wavelengths, Applied Optics, Feb. 1, 1982, vol. 21, No. 3, pp. 547–553.

R. H. West et al., Characteristics of light induced annealing in irradiated optical fibres, Electronics Letters, The Institution of Electrical Engineers, May 27, 1982, vol. 18, No. 11, pp. 483–484.

*Primary Examiner*—Brian Healy
*Attorney, Agent, or Firm*—Pillsbury Madison & Sutro LLP

[57] ABSTRACT

A multimode optical fiber for UV light transmission, able to be sterilized with gamma radiation, has a core including undoped synthetic silica, a cladding including fluorine doped synthetic silica, a hydrogen content higher than $5\times10^{19}$ molecules/cm$^3$ and a metal coating that retards diffusion of hydrogen outwardly from the fiber, the metal being selected from aluminum, copper, zinc, tin, silver and gold. The metal coating has a high diffusion coefficient below 150° and a low diffusion coefficient at a hydrogen loading temperature above 250° C. The optical fiber may have a high-OH content of 50 to 1500 ppm and a low-OH content below 50 ppm after treatment. The optical fiber may also or alternatively have a low-OH content below 50 ppm, and preferably below 5 ppm, before treatment. A gamma radiation sterilized multimode fiber bundle may include a plurality of such optical fibers. A gamma radiation sterilized catheter may include at least one optical fiber or a fiber bundle. A process for producing the gamma radiation sterilized fibers includes manufacturing a preform having a core including undoped synthetic silica and a cladding including fluorine doped silica; drawing the preform into a fiber and annealing the fiber for reducing drawing-induced UV defects; coating the fiber with a metal coating thereby retarding migration of hydrogen outwardly from the fiber. A delivery system for transporting light including at least one optical fiber and apparatus for transporting light using the delivery system are also described.

34 Claims, 22 Drawing Sheets

APPARATUS

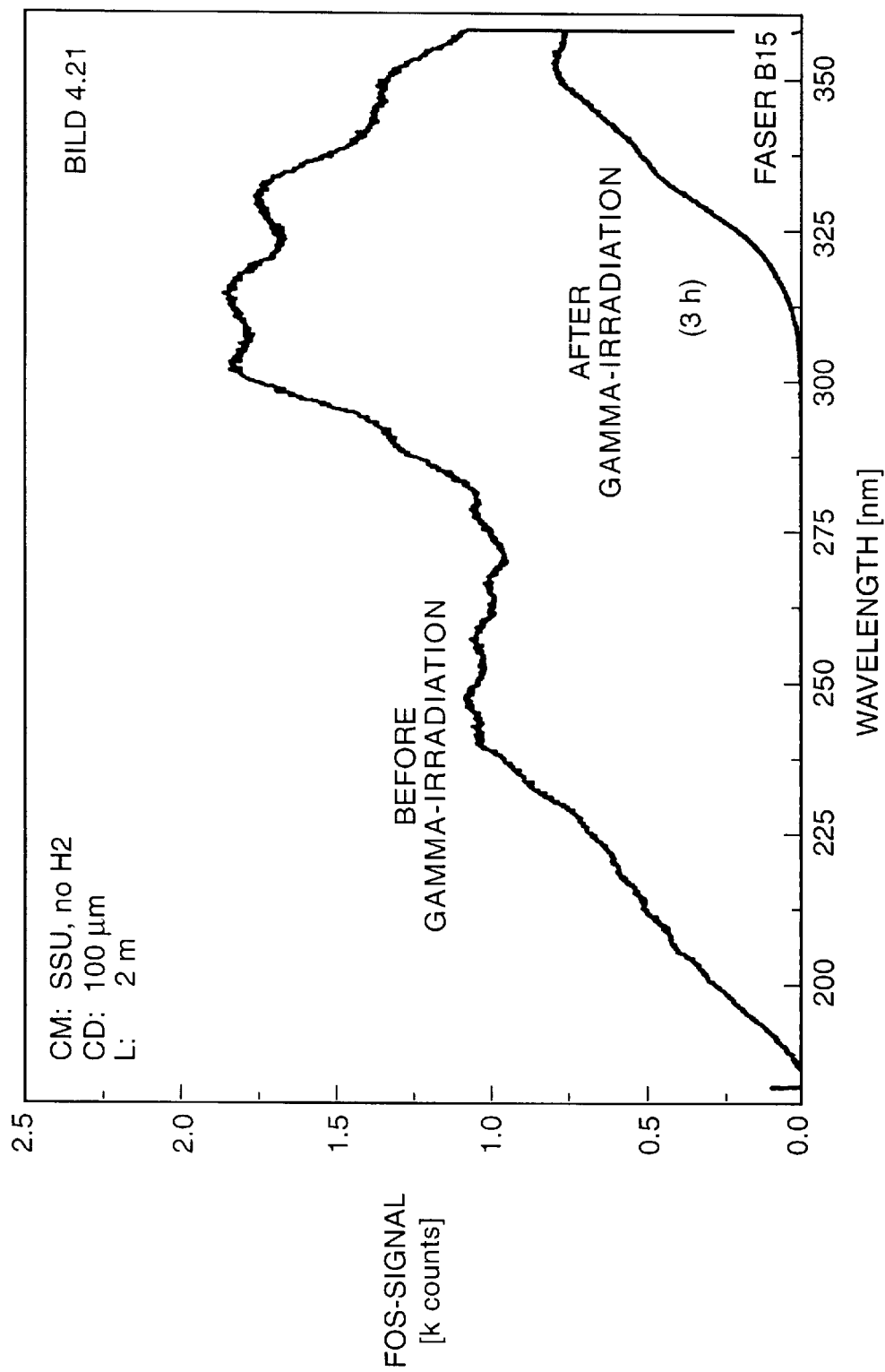

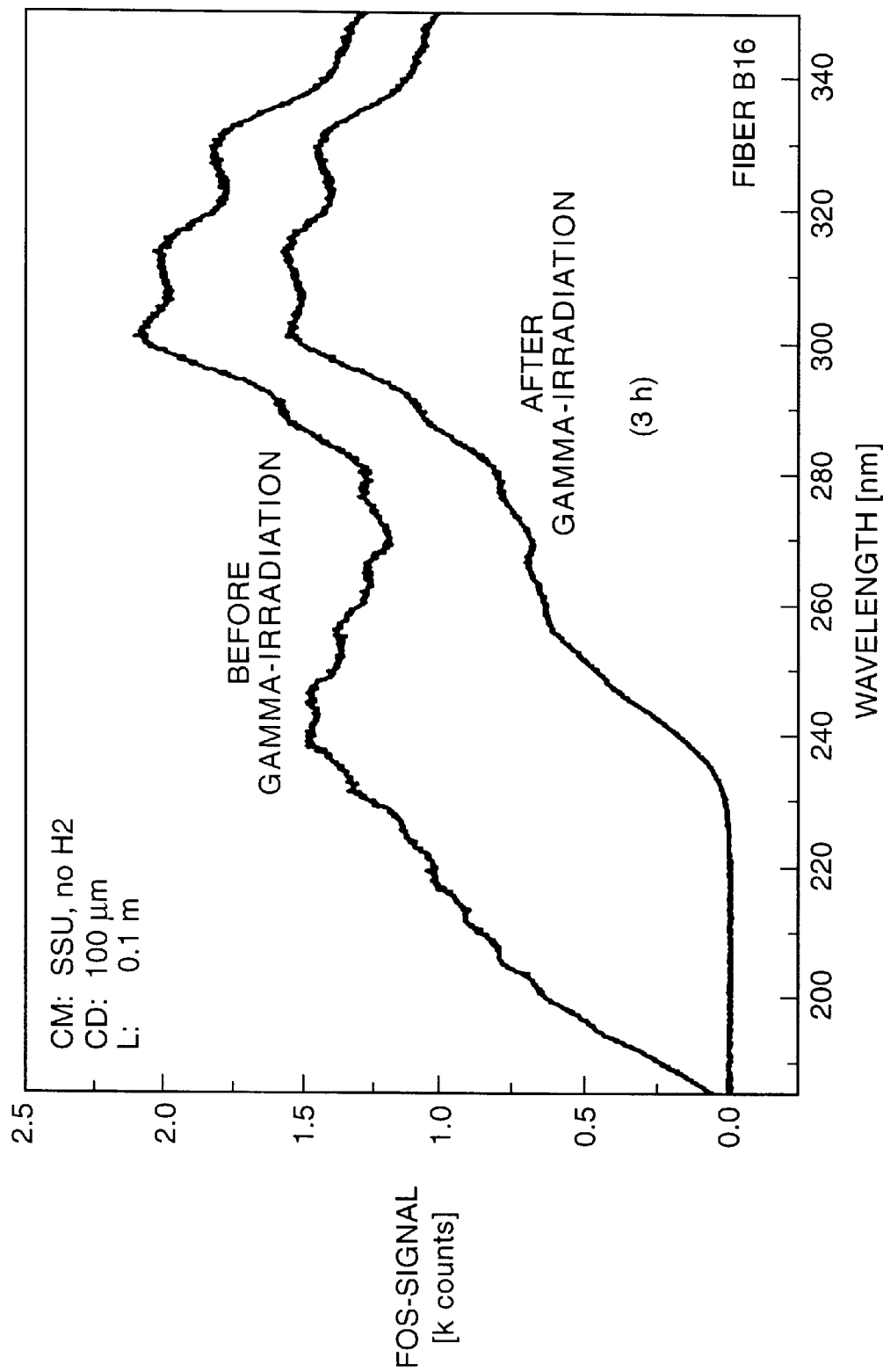

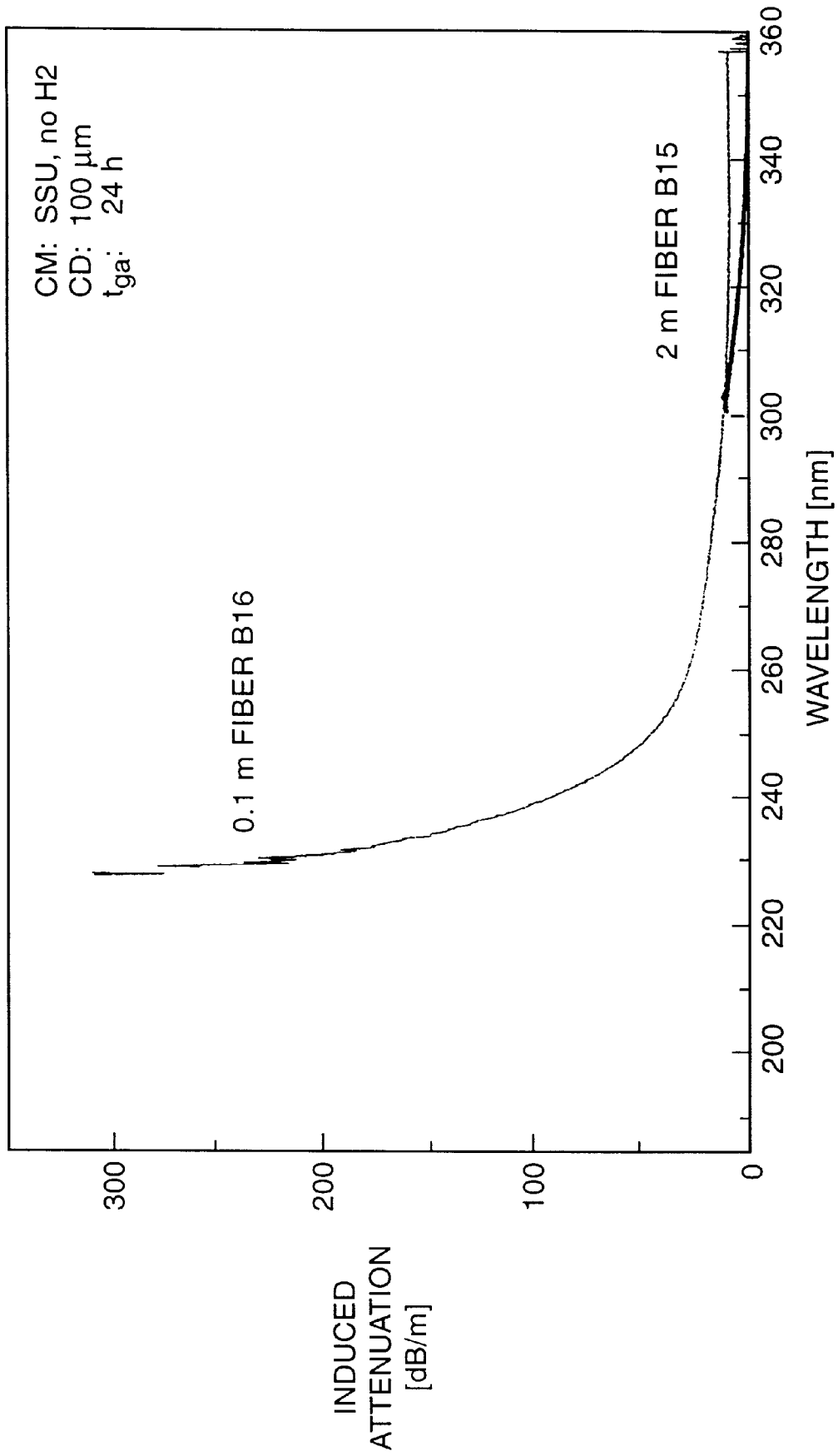

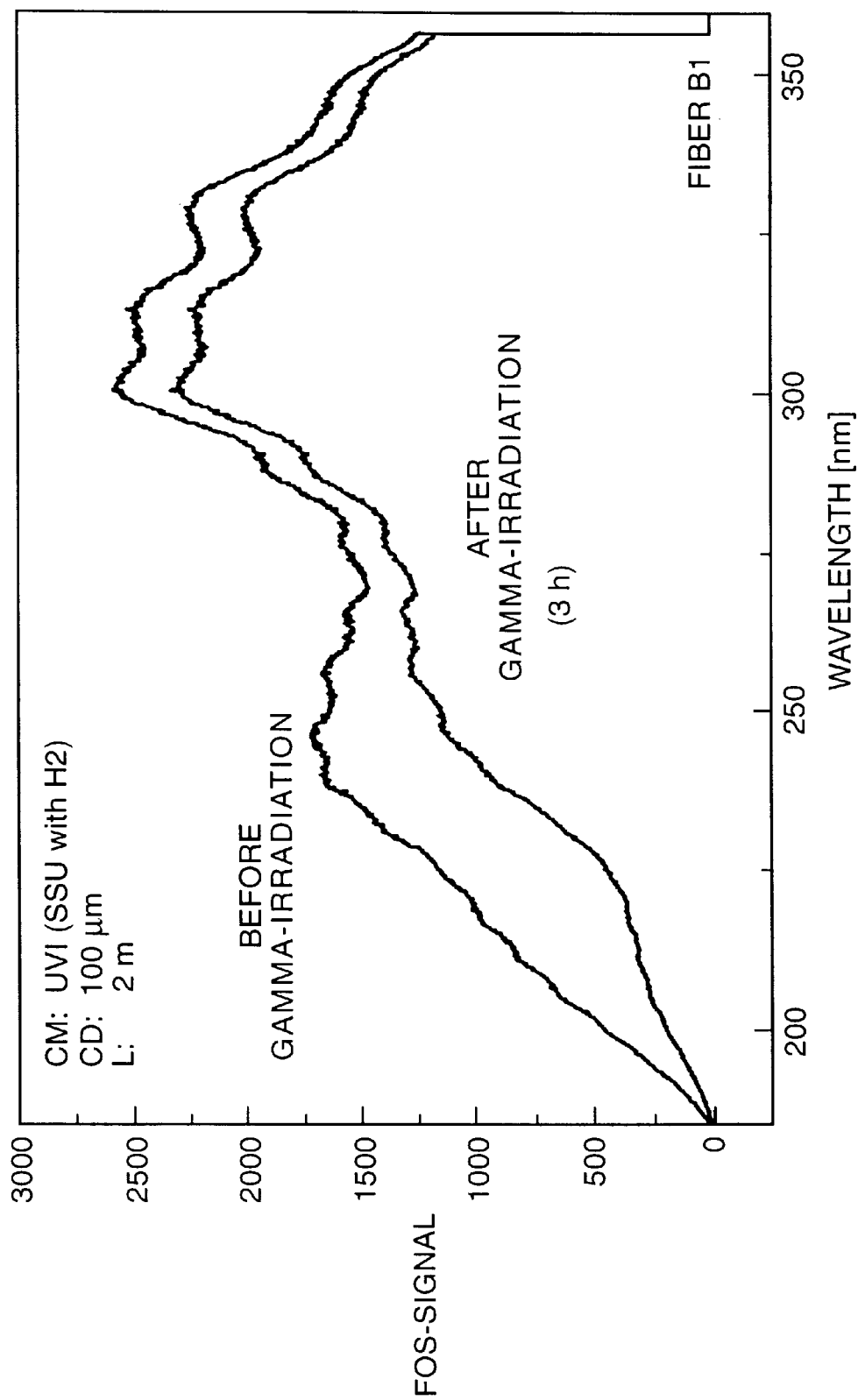

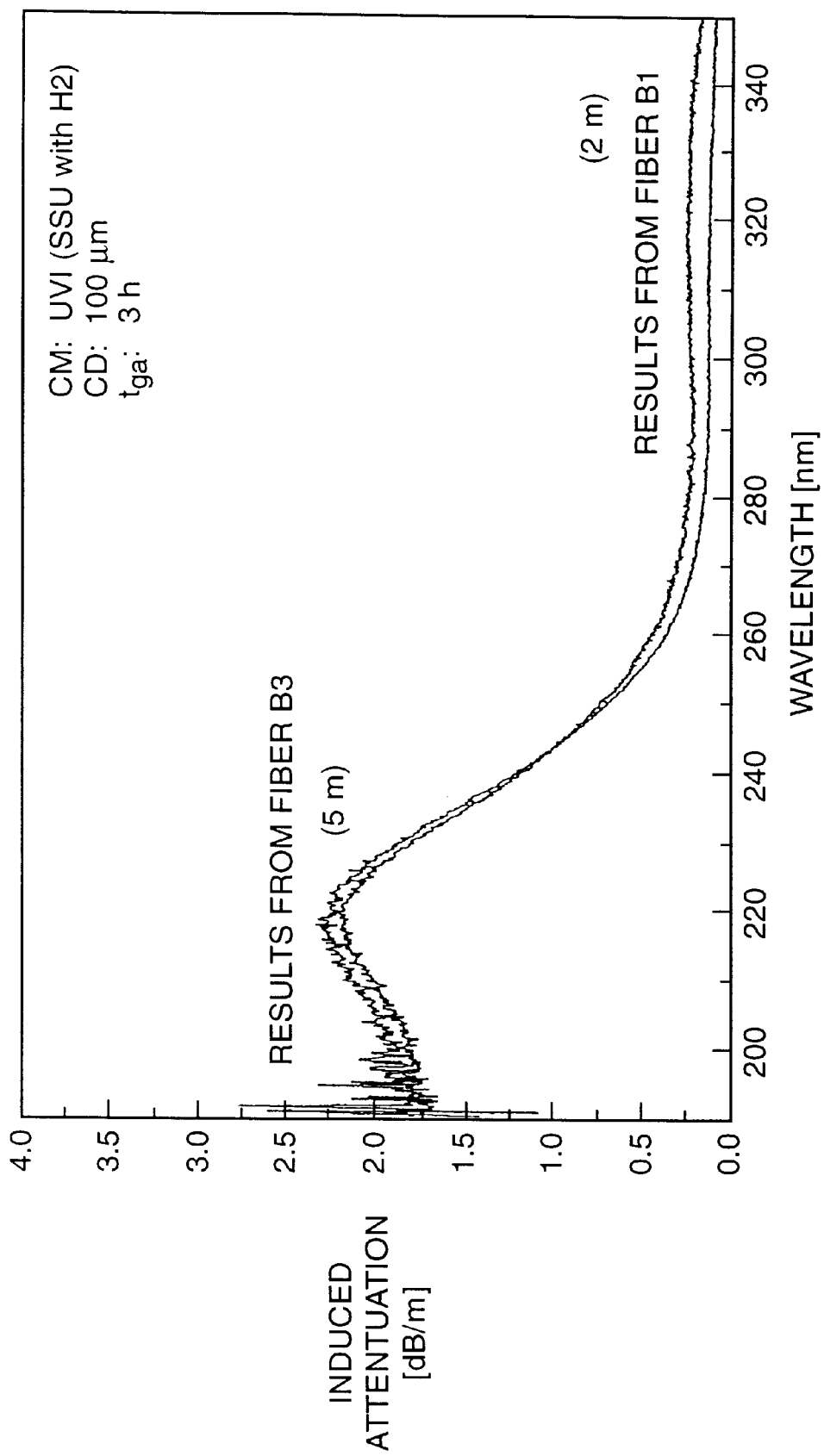

APPARATUS

GAMMA RADIATION STERILIZED FIBER OPTIC UV DELIVERY SYSTEMS

FIELD OF THE INVENTION

The invention relates to fiber optic systems for delivery of UV radiation. The fiber optic systems are sterilized with gamma radiation.

BACKGROUND OF INVENTION

In the past, UV-transmission through silica based multimode-fibers with an undoped synthetic core and fluorine doped cladding has been unsatisfactory due to generation of UV defects. Such UV fibers have been used for light transportation mainly with deuterium lamps, excimer-lasers at 308 nm, 248 nm and 193 nm, frequency doubled argon lasers and fourth harmonic Nd-YAG lasers.

Due to material modification (e.g. reduction of chlorine, increase of OH-ions, stoichiometric deposition) and due to hydrogen loading at high pressure (see German Patent DE 195 47 904 A1), it was found that the UV-damage could be significantly reduced. In particular, E'-centers due to weak bonds or chlorine impurities could be passivated by hydrogen, shown in the improved UV-performance of the fibers. Especially, thick core fibers, having a core diameter greater than 300 $\mu$m, have a long lifetime because the reduction of hydrogen content by outgasing decreases with increasing fiber diameter. The lifetime, defined as the time leading to a 3 dB/m induced loss at 214 nm, is initially linear with the cross-section area. However, for thinner fibers in a fiber bundle, the commercially available UVI(SR)-fibers from Polymicro Technologies, Inc. loaded with hydrogen do not have a sufficiently long lifetime.

The limited lifetime of UVI(SR) fibers loaded with hydrogen is due to the fact that hydrogen in UV-damaged material is not sufficiently bonded and migrates outwardly to diffuse from the fiber. The hydrogen diffuses out of the fiber, especially from thin fibers, e.g. from fiber bundles having fibers with a core diameter around 100 $\mu$m and a cladding diameter of about 110 $\mu$m or singlemode fibers having a core diameter about 10 $\mu$m and a cladding diameter of about 125 $\mu$m (typical values). In this case, the lifetime is restricted to the range of about one month or less, at room temperature. However, hydrogen reloading is possible leading to similar performance comparable with the performance after the initial hydrogen loading.

In previously known applications, a hermetic coating (carbon is mainly used) as a hydrogen barrier is used in the opposite direction to prevent indiffusion of hydrogen into silica fibers in order to avoid the generation of absorption bands in the NIR-region, which is used for optical communication in telecom applications (at 1.55 $\mu$m lowest attenuation value of 0.2 dB/km). The hydrogen induced attenuation may be orders of magnitude higher than the basic attenuation, depending on the surrounding atmospheric pressure.

Similar results have been obtained with short length high-OH silica bulk samples loaded with hydrogen. The UV-transmission is found to be more stable in comparison to standard bulk material. Parallel studies have been carried out on low-OH material using a high temperature hydrogen treatment to modify the UV defects, leading to a material having OH-content of approximately 20 ppm. However, the hydrogen content in the samples, due to the hydrogen pressure used, is significantly lower than in the fiber of the invention described below.

Although an advantage of hydrogen in resistance against high-energy radiation or particles has been shown in silica bulk material and fibers, the previous studies were done with the incorrect loading parameters and without taking into account the outgasing of hydrogen during storage at room temperature or during testing, based on our new knowledge. On the other hand, most of the radhard-studies have been done in the wavelength region above 400 nm (VIS- or IR-region) because the UV-damage seemed to be too severe.

The role of hydrogen for radiation-improved material in the VIS- and IR-region has been described in several papers. However, no data are available concerning UV-performance in gamma-irradiated fibers with hydrogen, in comparison to irradiated fibers without hydrogen. Up to now, the influence of gamma-irradiation on UV-performance of UV-fibers, either singlemode- or multimode fibers having undoped silica core, with and without parallel UV-light transportation, has not been known.

The high-OH material has been studied in detail because of the well known UV-performance (because of residual hydrogen). However, low-OH undoped core material is attractive for the deep UV-region, because there is an indication that the UV-edge is shifted to shorter wavelengths. However, the drawing-induced UV-defects are so high that commercial usage of low-OH fibers in the deep U-region is not known.

Results of gamma-radiation on fiber transmission, mainly in the VIS- and IR-region, are summarized in the literature: SPIE-Proceedings Vol. 787 (Orlando 1986), Vol.867 (Cannes 1987), Vol. 992 (Boston 1992), Vol. 1174 (Boston 1989), Vol. 1799 (Boston 1992) or in /Grisc 1,2; Frieb 1; Lyons 1,2/. An excellent state of the art of radiation hard fibers in 1990 is described in "Large hadron collider workshop (Aachen, October 1990)" by G. Jariskog and D. Rein (editors)/Fabian 2/. In addition, a new paper concerning gamma-induced losses in the VIS-region point out that residual hydrogen may improve the fiber slightly (Grisc 3,4.)

In /Lyons 1/ the UV-transmission and the transient radiation sensitivity of standard UV-fibers have been compared; however, the U-transmission was only measured before treatment for the reasons described above.

No knowledge exists at the moment concerning UV-annealing in the UV-region, after gamma-damage, with a low-power deuterium-lamp or a high-power UV-laser starting below 350 nm due to two-photon absorption.

SUMMARY OF THE INVENTION

A multimode optical fiber for UV light transmission, sterilized with gamma-radiation, including an optical fiber having a core of synthetic silica that is undoped or doped with less than 1% fluorine; a cladding of fluorine-doped or boron fluorine-doped synthetic silica; a hydrogen content in the optical fiber higher than $5 \times 10^{19}$ molecules/cm$^3$; and a coating on the optical fiber comprising a metal selected from aluminum, copper, zinc, tin, silver and gold, for suppressing hydrogen diffusion outwardly from the fiber, the coating having a high diffusion coefficient below 150° C. and a low diffusion coefficient at a hydrogen loading temperature higher than 250° C. The hydrogen content may be higher than $2 \times 10^{20}$ molecules/cm$^3$ and the optical fiber may have different OH-levels. Although the high-OH core material with OH-content above 50 ppm, typically between 50 and 1500 ppm, will be mainly recommended for most applications. The fiber may have low-OH core material with OH-content below 50 ppm, preferably below 5 ppm, after treatment with hydrogen and sterilizing with gamma radiation.

A sterilized multimode fiber bundle may include a plurality of such optical fibers and a coating of aluminum oxide on the end faces of the fiber bundle.

A process for producing such gamma radiation sterilized optical fibers includes manufacturing a preform having a core of undoped synthetic silica that is undoped or doped with less than 1% fluorine and a cladding of fluorine doped or boron-fluorine doped synthetic silica; drawing the preform into a fiber; annealing the fiber for reducing drawing-induced UV defects; coating the fiber with a metal selected from aluminum, copper, zinc, tin, silver and gold, for suppressing hydrogen diffusion outwardly from the fiber, the coating having a high diffusion coefficient below 150° C. and a low diffusion coefficient at a hydrogen loading temperature above 250° C.; and thereby obtaining a coated optical fiber from which migration of hydrogen is substantially suppressed below 150° C. The process may further include processing the coated fiber at a temperature above 250° C. in a hydrogen atmosphere above 20 atmospheres pressure, whereby hydrogen migrates through the coating into the fiber; and cooling the coated fiber. The hydrogen atmosphere may be at a pressure above 30 atmospheres. The fiber may be irradiated with about 0.5–5 Mrad, preferably about 2 Mrad, total dose of gamma radiation, for sterilizing the fiber. UV annealing with a UV source may take place along the axis of the fiber. The UV source may be selected from a UV laser irradiating below 350 nm and a broadband deuterium lamp. The UV annealing may take place with side illumination after gamma irradiating, with a UV source selected from a UV laser irradiating below 350 nm, a broadband deuterium lamp, an excimer laser lamp and a high pressure mercury lamp or annealing may take place using heat.

A delivery system using the above described sterilized fibers or fiber bundle may be used for transportation of UV radiation produced by a broadband low power UV source or by high power continuous or pulsed UV lasers. A delivery system including gamma radiation sterilized multimode fibers may also be used for light transportation in the visible or infra-red regions under ionizing radiation.

According to the invention, hydrogen is diffused into the fiber after drawing, as described in DE 195 47 904 A1, or into the preform before drawing without significant diffusion loss during drawing. The metal coating is a hermetic metal coating is used for sealing the fiber to suppress outgasing of hydrogen.

Due to the new hydrogen loading technique including the metal coating, the hydrogen level in an optical fiber is significantly higher than in standard optical fibers used for UV transmission, and the outgasing of hydrogen is suppressed. The described suppression of outgasing of hydrogen is related to an additional surprising result of reaction of the metal coating with the silica surface. It is known that the diffusion coefficient of hydrogen in certain metals, e.g. aluminum, is of the same order of magnitude as in silica itself leading to a slightly longer lifetime of UV-stability due to a bigger cross-section area. Based on our studies of this improved drawing-process with metal coatings we have found that the metal coatings form an excellent barrier to outdiffusion of hydrogen. Depending on the coating parameters, a very thin surface layer of metal silicate, such as aluminum silicate, is built up on the surface of the cladding by reaction of the coating, such as aluminum, with the silica cladding. The thickness of this surface layer is approximately in the range of tens of nanometers, typically about 20 nm thick. The metal coated hydrogen loaded fibers are suitable for high temperature applications of approximately up to 125° to 150° C. For example, when aluminum is coated onto a glass fiber, a thin layer of aluminum silicate is formed that has a low diffusion coefficient at room temperature and a high diffusion coefficient at high temperatures, above about 250° C., allowing hydrogen to diffuse through the metal coating into the fiber at high temperature, while preventing outflow of the hydrogen from the fiber through the metal coating at temperatures below about 150° C.

DETAILED DESCRIPTION OF THE INVENTION

Figure 1A:
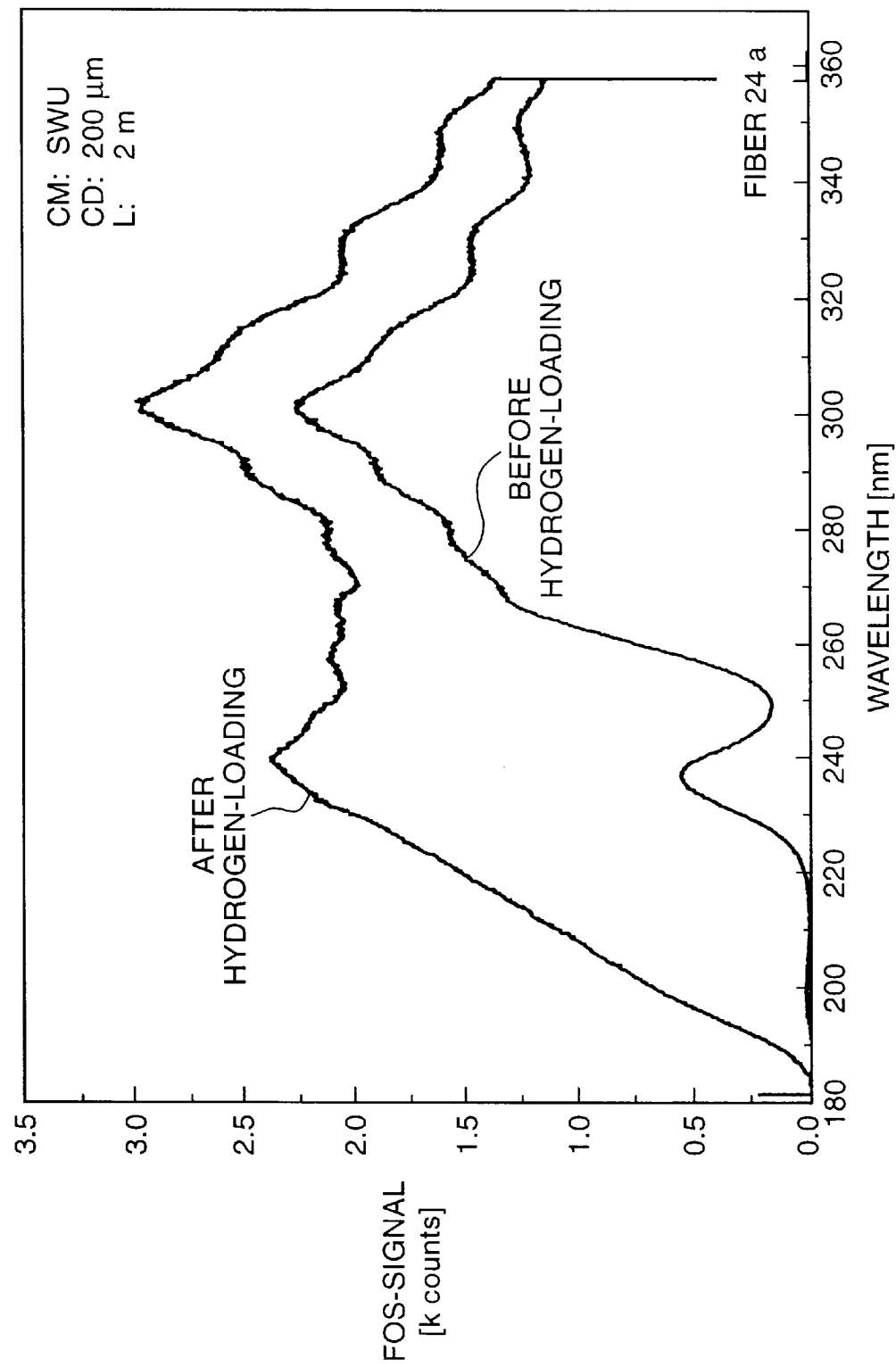
FIG. 1: Output signal (a), transmission gain (b) and gain value (c) in a low-OH undoped core fiber after hydrogen-treatment in the UV-region.

We found that hydrogen has a dramatic annealing effect for the drawing-induced UV-defects in step-index fibers having an undoped synthetic silica core and a fluorine doped cladding. Especially below 270 nm, a significant improvement of UV-transmission in low-OH undoped silica core fibers is possible after hydrogen-loading (FIG. 1). It is also possible to use deuterium in the same way as hydrogen in the passivation of the UV defects.

Figure 1B:
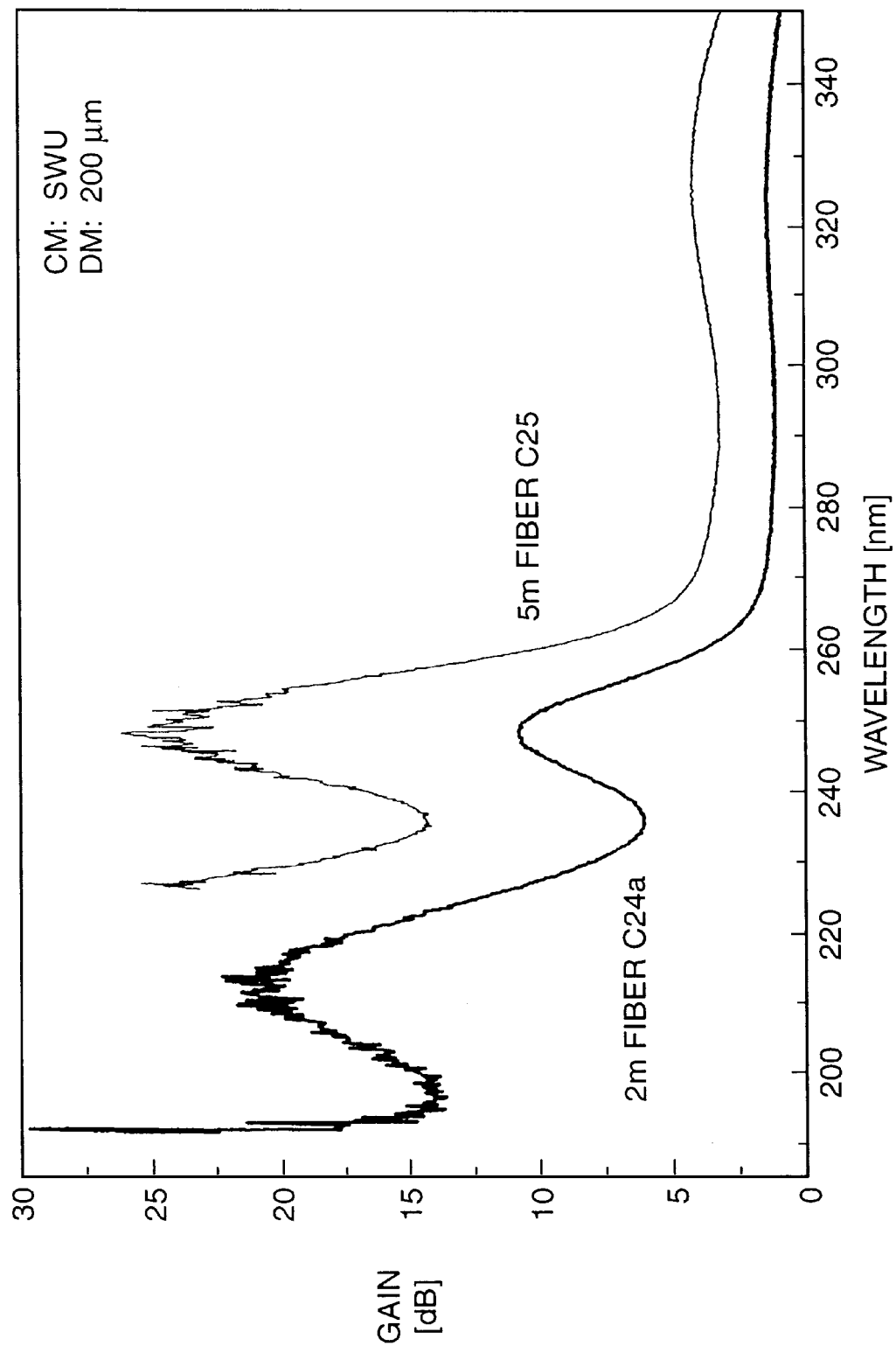
Figure 1C:
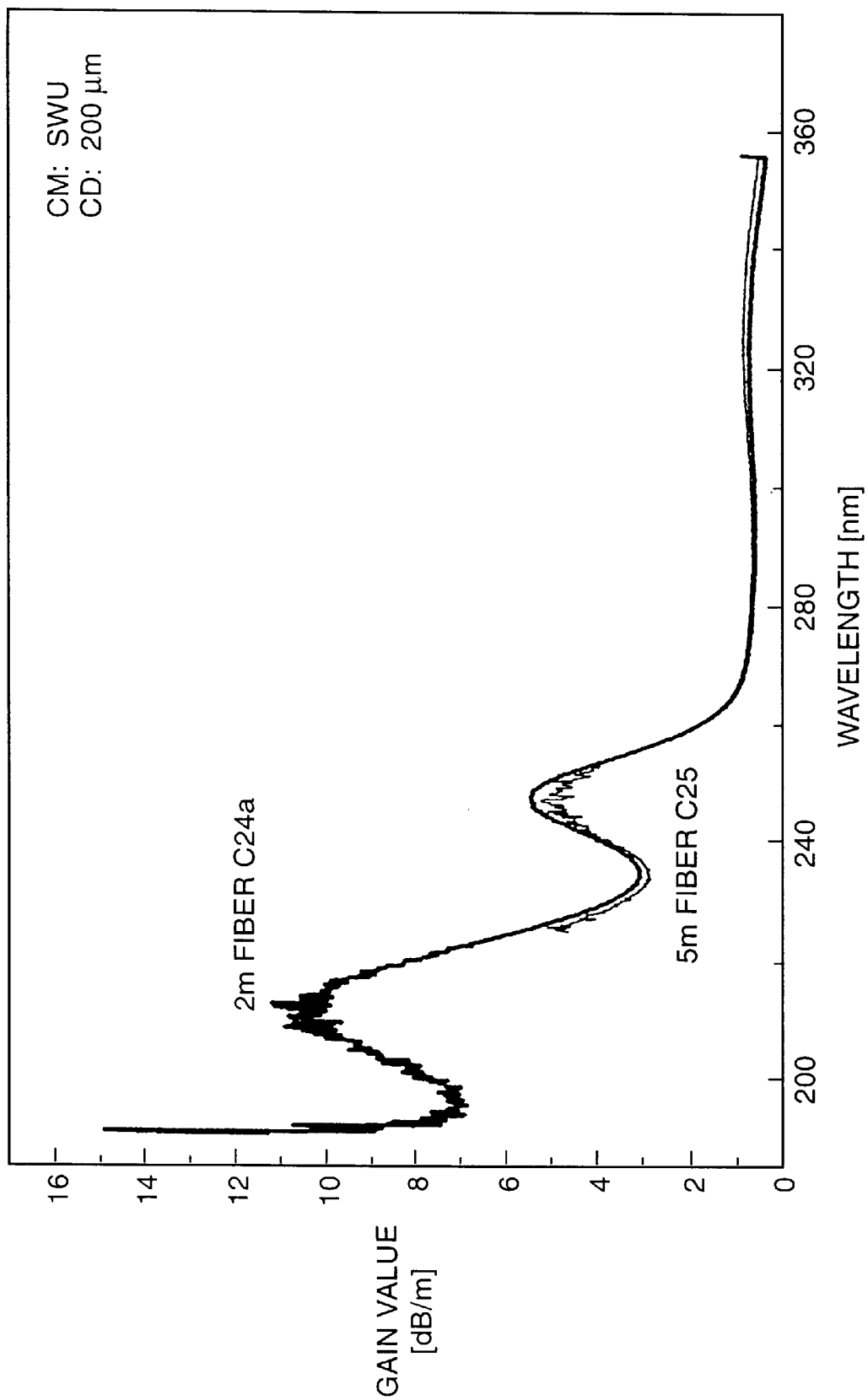
Figure 2:
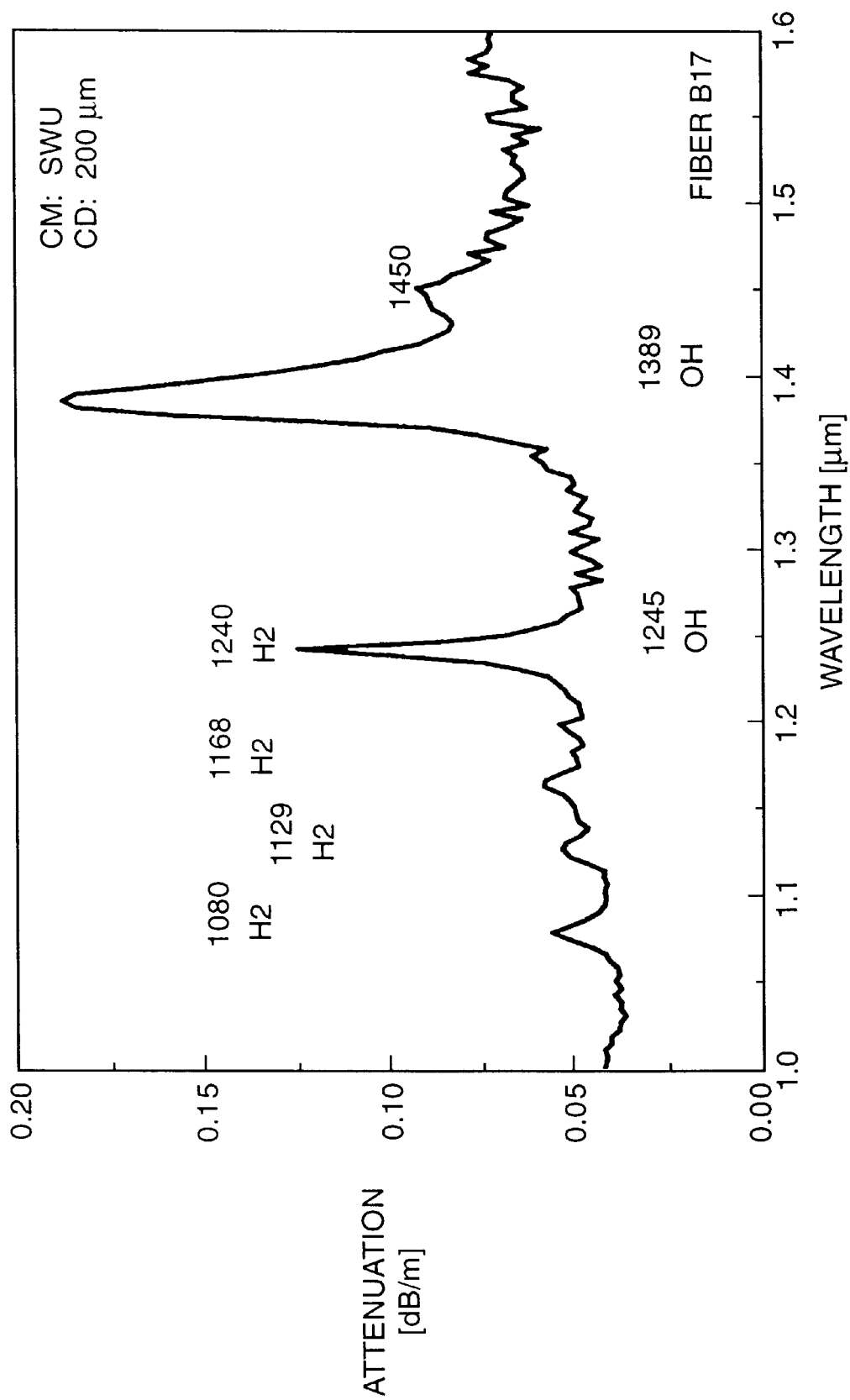
FIG. 2: Hydrogen-induced attenuation in low-OH fibers, measured in the IR-region.

The UV-light power output measured with a fiber optic (FO) spectrometer is at least one order of magnitude higher (FIG. 1a), using a loaded low-OH fiber instead of an unloaded one. Determining the difference, the spectral transmission gain [dB] is wavelength- and length-dependent (FIG. 1b). However, the gain coefficient [dB/m] is only wavelength-dependent with two maxima at 247 mn (oxygen-deficiency) with approximately 5.5 dB/m and at 215 nm (E'-center) with approximately 10.5 dB/m (FIG. 1c). On the other hand, it is well known that molecular hydrogen creates induced losses in the IR-region (FIG. 2). FIG. 2 shows the results of measurement with a longer piece of a low-OH fiber described in FIG. 1. The IR absorption bands can be used to control the loading process to reduce manufacturing costs and control the quality.

Because this annealing effect with hydrogen is not previously known, the standard UV-fibers contain a high-OH synthetic silica core. However, depending on the additional impurities and deposition-conditions, the amount of UV-light-induced defects are different. Using standard material, Fluosil SSU preforms, obtained from Heraeus Corporation, Germany, the major commercially available preform material, the induced loss at 214 nm (E'-center) with a 1 m long sample is approximately 20–25 dB, using a broadband deuterium-lamp with approximate spectral intensity of 5 $\mu W/(nm \times mm^2)$ at 214 nm for UV-damage. However, with an improved core material (UVX) the 214 nm band can be suppressed down to approximately 2 dB in a 1 m long sample with 200 $\mu m$ core diameter, using the same deuterium-lamp with the same input conditions.

Due to the improvement of the UV-performance, the UVI-fibers are under tests for several applications. However, the usage of fiber bundles and fibers for UV applications in medicine, chemistry or biology is still restricted because the fiber optic components including the catheter have only been sterilized by steam or by an ETO process (ETO requires a long waiting period before use). On the other hand, in the medical field gamma-sterilization is a standard process for all types of medical devices. Optical damage caused by the gamma radiation has previously prevented the use of gamma-sterilization in fiber optic medical devices. Use of the gamma sterilized optical fibers and bundles of the invention will enable medical device manufacturers to reduce production times and manufacturing costs.

Figure 3C:
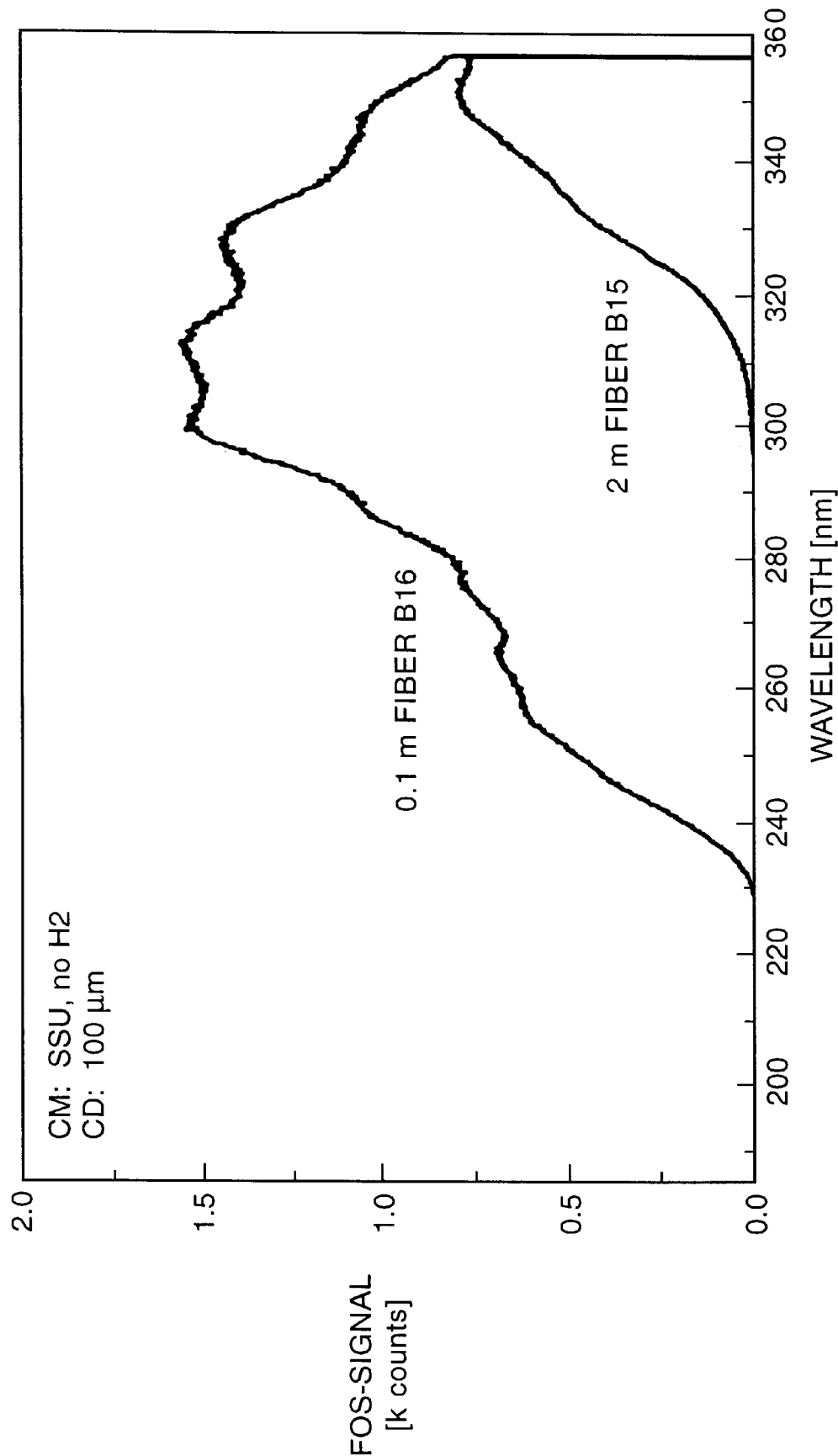
FIG. 3: Output signal in UV-region before and after a 3 h gamma-irradiation of a standard UV-fiber (typical) with undoped high-OH core and fluorine doped cladding; this fiber also shows UV-damage during UV-exposure (sources: broadband deuterium-lamp with spectral fiber input intensities of approximately 5 $\mu W/(nm \times mm^2)$ at 214 nm, UV-lasers below 280 nm); drawn from Fluosil preforms; length: 2.0 m (a), 0.1 m (b) and both (c).
Figure 4:
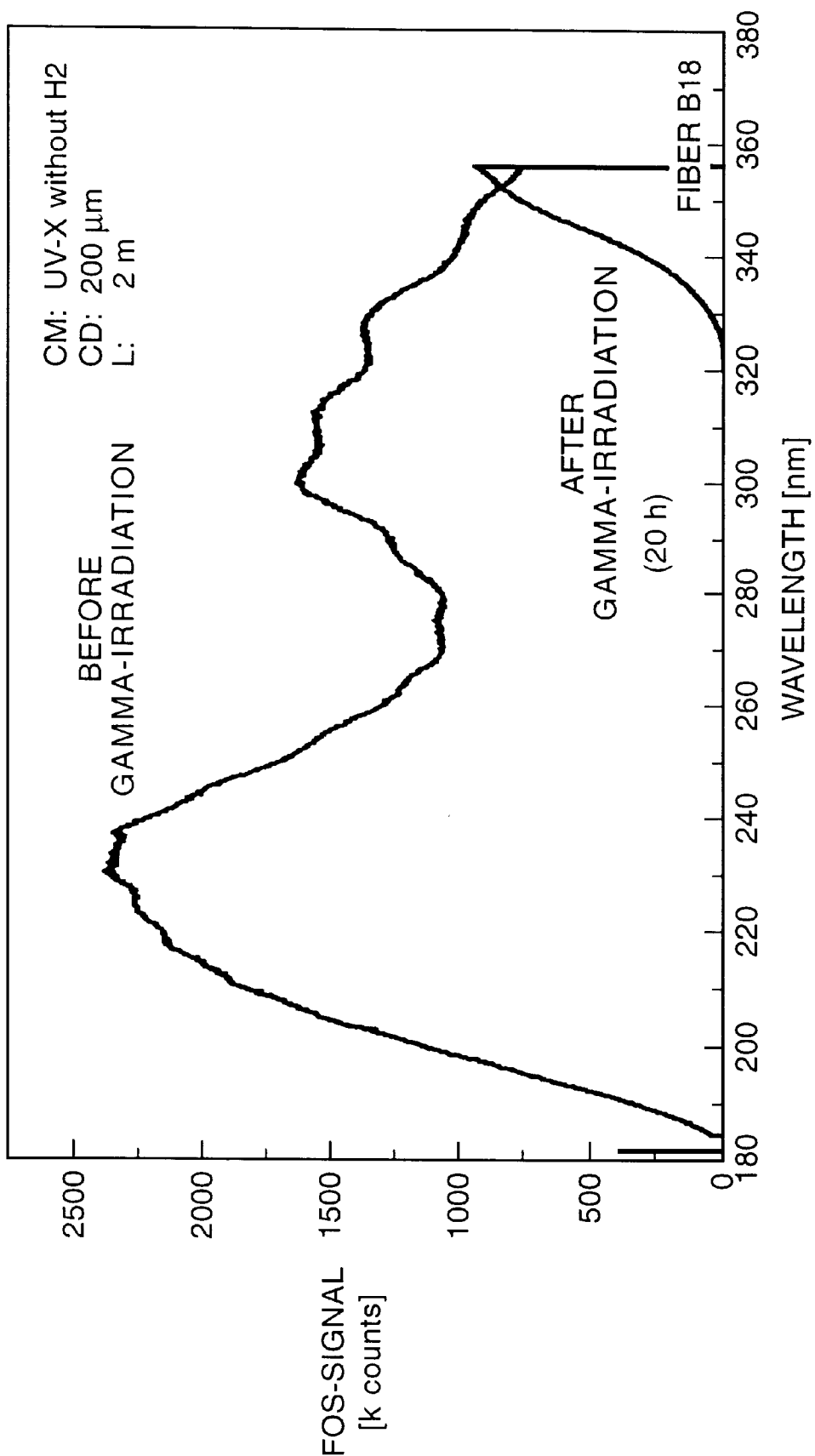
FIG. 4: same as FIG. 2, but using a modified core material (UVX) showing no significant UV-damage during UV-exposure without hydrogen-loading.
Figure 5A:
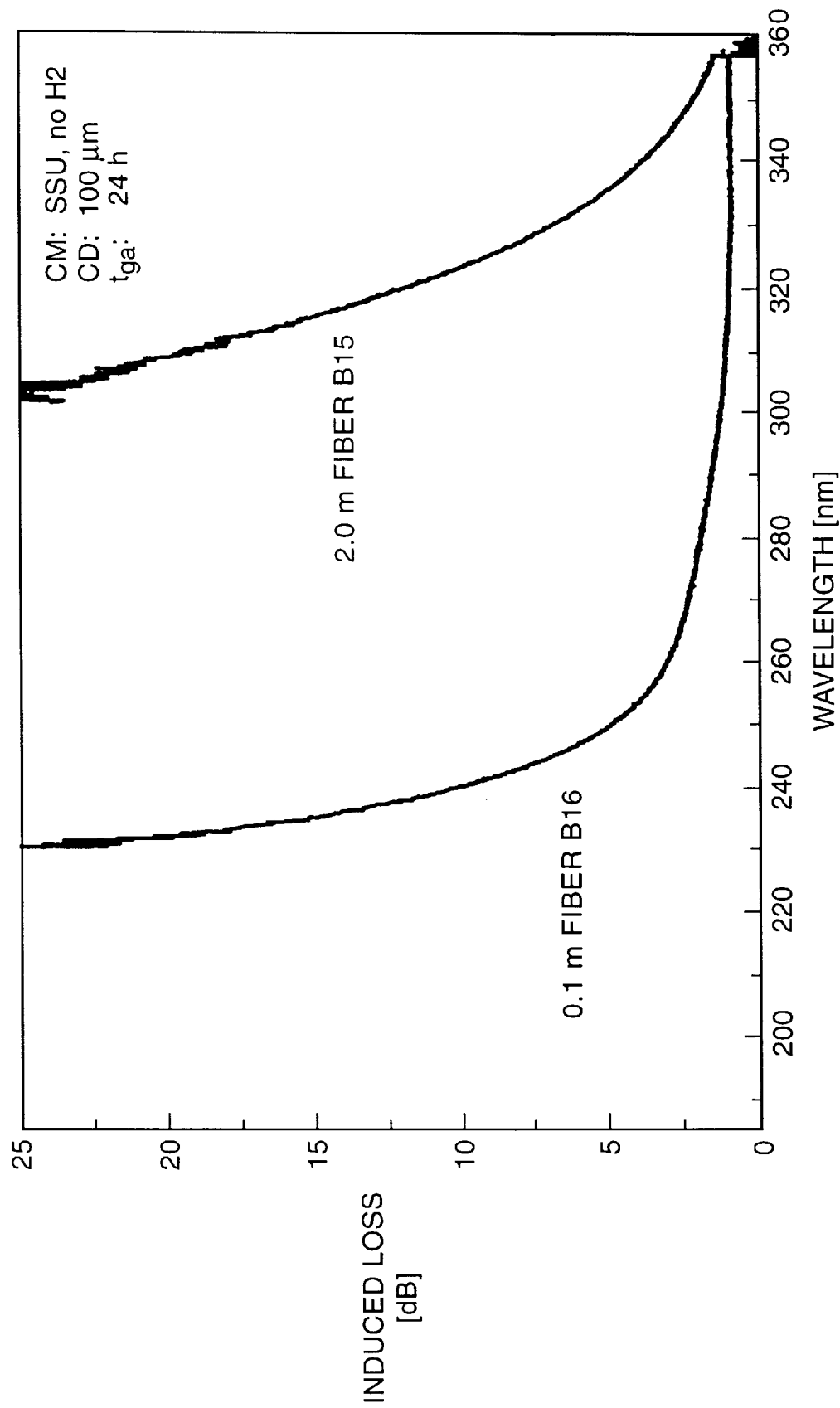
FIG. 5: UV-damage due to gamma-irradiation in a high-OH standard fiber: induced loss for two lengths (a) and induced attenuation (b).

Up to now, all standard fibers including core modifications, such as reduction of chlorine and modifications of deposition parameters of core material and preform, have been damaged strongly in the UV-, VIS- and IR-region because strong Si—O bonds are broken by the high-energy gamma radiation. Therefore, no UV-transmission will be expected in unloaded fibers in the region below 280 nm. This is confirmed in FIG. 3 and FIG. 4. The 2 m long samples of standard UV-fibers will become transparent above 300 nm with a 3 dB cutoff wavelength of approximately 330 nm, using a total dose of approximately 300 krad, equivalent to approximately 3 kGray; based on our gamma-source the period of 3 h was used for this total dose. The more UV resistant UV-fiber, with UVX-material, shows the same result for gamma-damage (FIG. 4), using a longer treatment of approximately 20 h, and cannot be used in the proposed applications. The cutoff wavelength is shifted slightly to a longer wavelength. However, this is an influence of the higher total dose. For long irradiation periods the gamma-induced defect concentration increases nonlinearly with total dose. Reducing the fiber length to 10 cm (FIGS. 3b,c), the cutoff wavelength is shifted to shorter wavelength. The strong 214 nm absorption band is the dominant factor and restriction for shorter wavelength transmission. Based on the shape of this absorption band with the short sample, we can estimate a gamma-induced loss of approximately 40 dB (FIG. 5a) leading to a gamma-induced attenuation of 400 dB/m at 214 nm (FIG. 5b).

The gamma-induced defect concentration is more than two orders of magnitude higher than the UV-induced defect concentrations in the commercially available UV fiber mostly used: the absorption value at 214 nm of approximately 400 dB/m, as shown above in FIG. 5, is a typical value for gamma-sterilized fibers (>2 Mrad or 20 kGray), in comparison to approximately 25 dB/m in UV-irradiated fibers exposed to a deuterium lamp with an input spectral intensity of 5 $\mu W/(nm \times mm^2)$ at 214 nm.

Figure 6B:
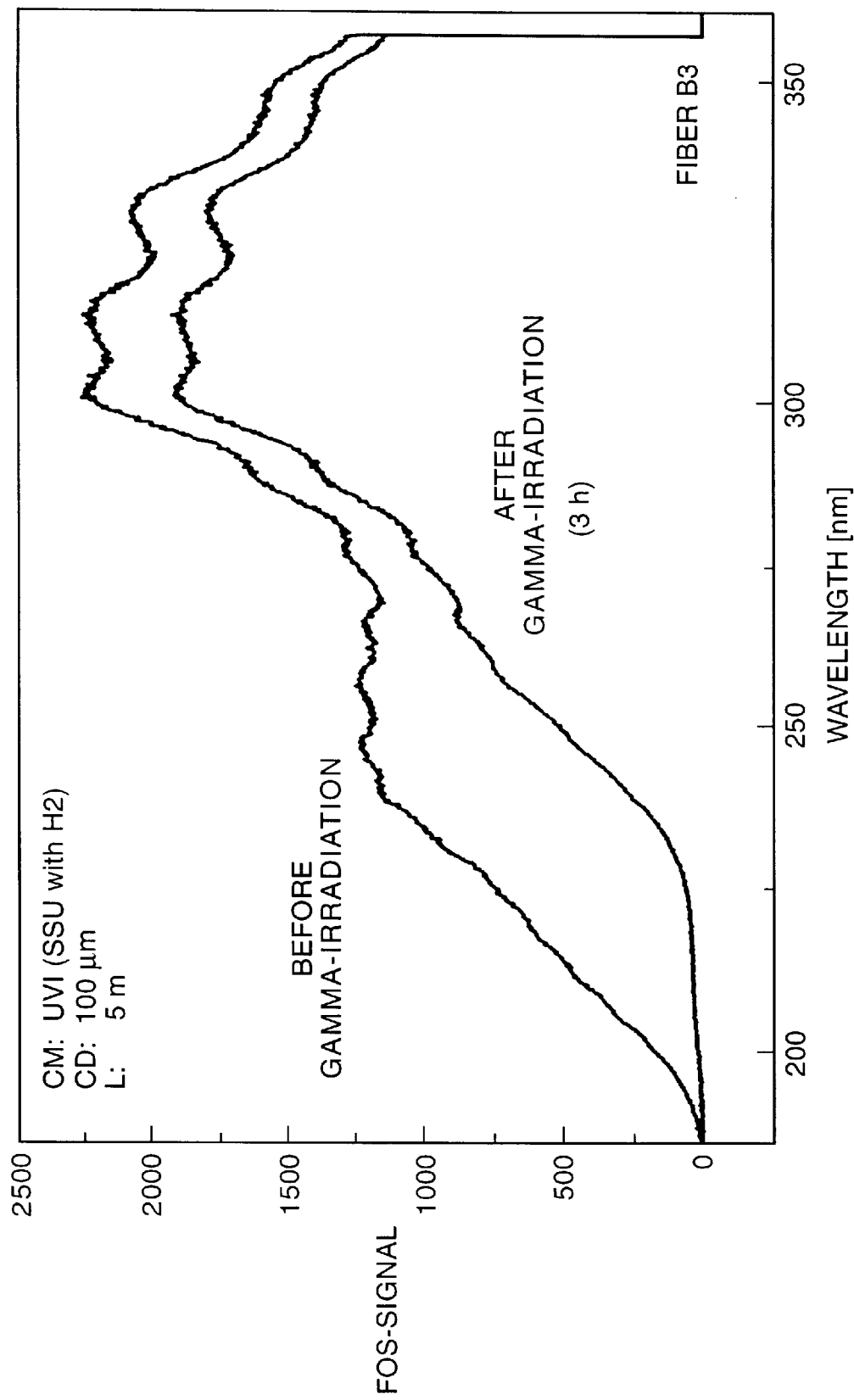
FIG. 6: Output signal of the new fiber before and after a 3 h gamma-irradiation, using 2 m long sample (a) or a 5 m long sample (b) with 100 $\mu$m (micrometer) core diameter.
Figure 7A:
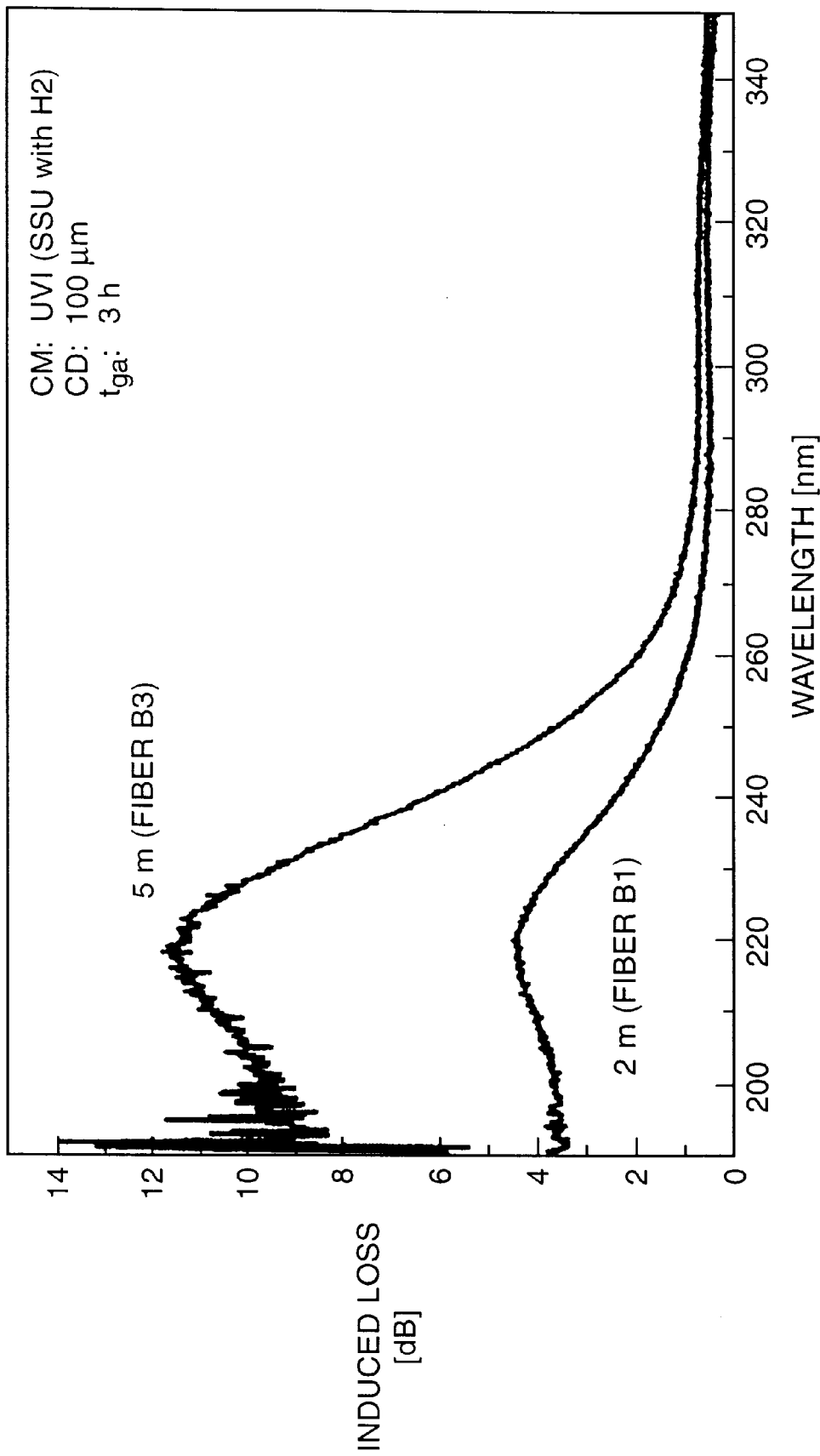
FIG. 7: Induced loss (a) and attenuation (b) after 3 h gamma-irradiation, based on FIG. 6.

Therefore unexpectedly, the hydrogen-loaded fibers at very high pressures are still transmitting UV-light during and after gamma-radiation. The spectral output power before and after gamma-irradiation of 3 h show only a small decrease of gamma induced UV-losses below 260 nm, using a 2 m long fiber (FIG. 6a) and a 5 m long fiber (FIG. 6b). In addition, using fiber samples up to 5 m lengths, the induced loss shown in FIG. 7a leads to a gamma-induced attenuation at 214 nm of approximately 7 dB/m, directly measured after gamma-irradiation with the total dose of about 2 Mrad which is necessary for sterilization. Based on additional measurements, the transmission at 214 nm is above 5% of the value before the gamma-irradiation, using a total dose of approximately 2 Mrad; the results are related to a loaded fiber with a length of 2 m and a core diameter of 200 $\mu m$.

Figure 8:
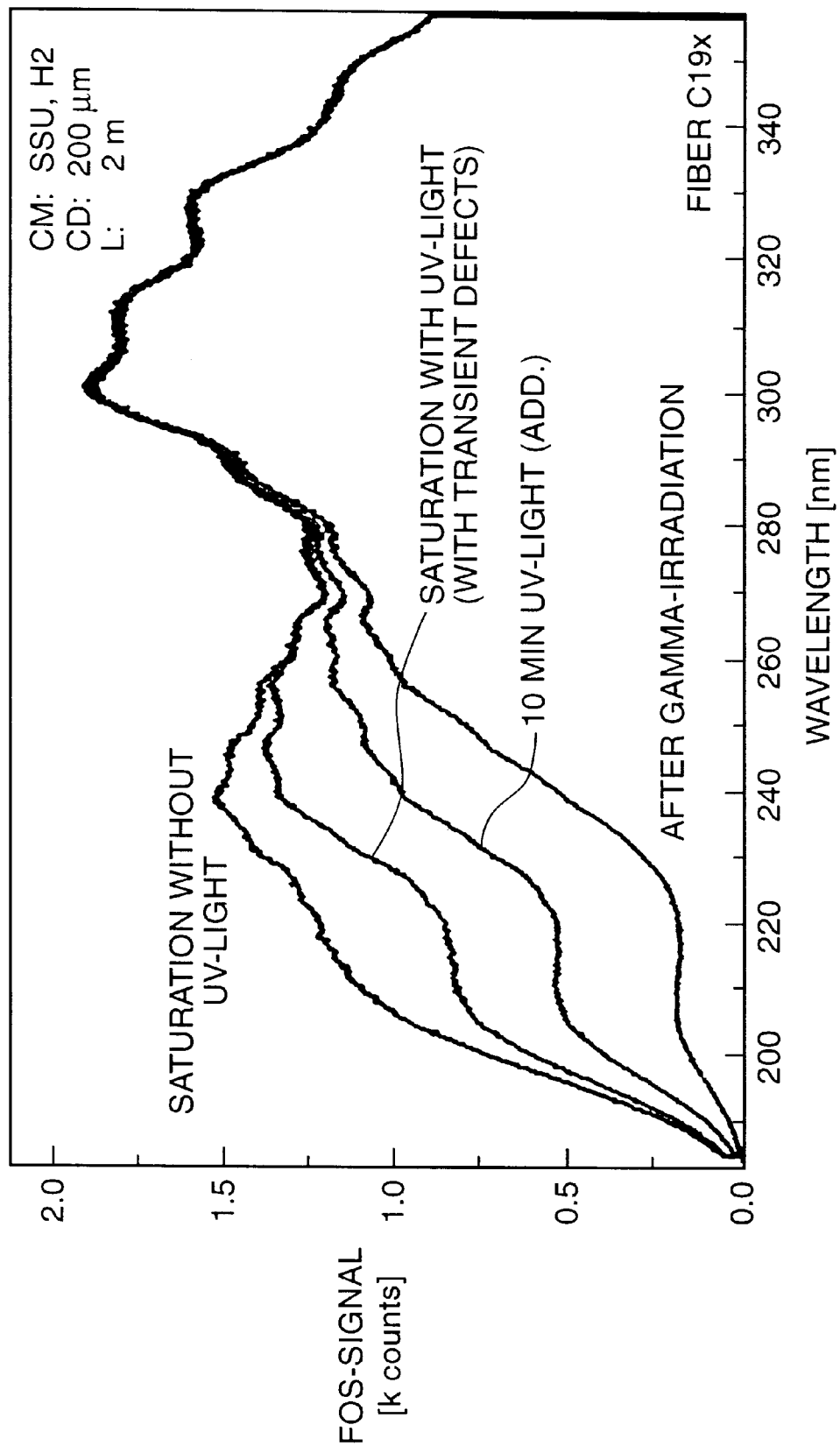
FIG. 8: Output signal of the new fiber after 20 h gamma-irradiation (lowest curve) and during UV-annealing, with UV-light until first saturation and until second saturation without UV-light due to reduction of transient UV-defects.
Figure 9:
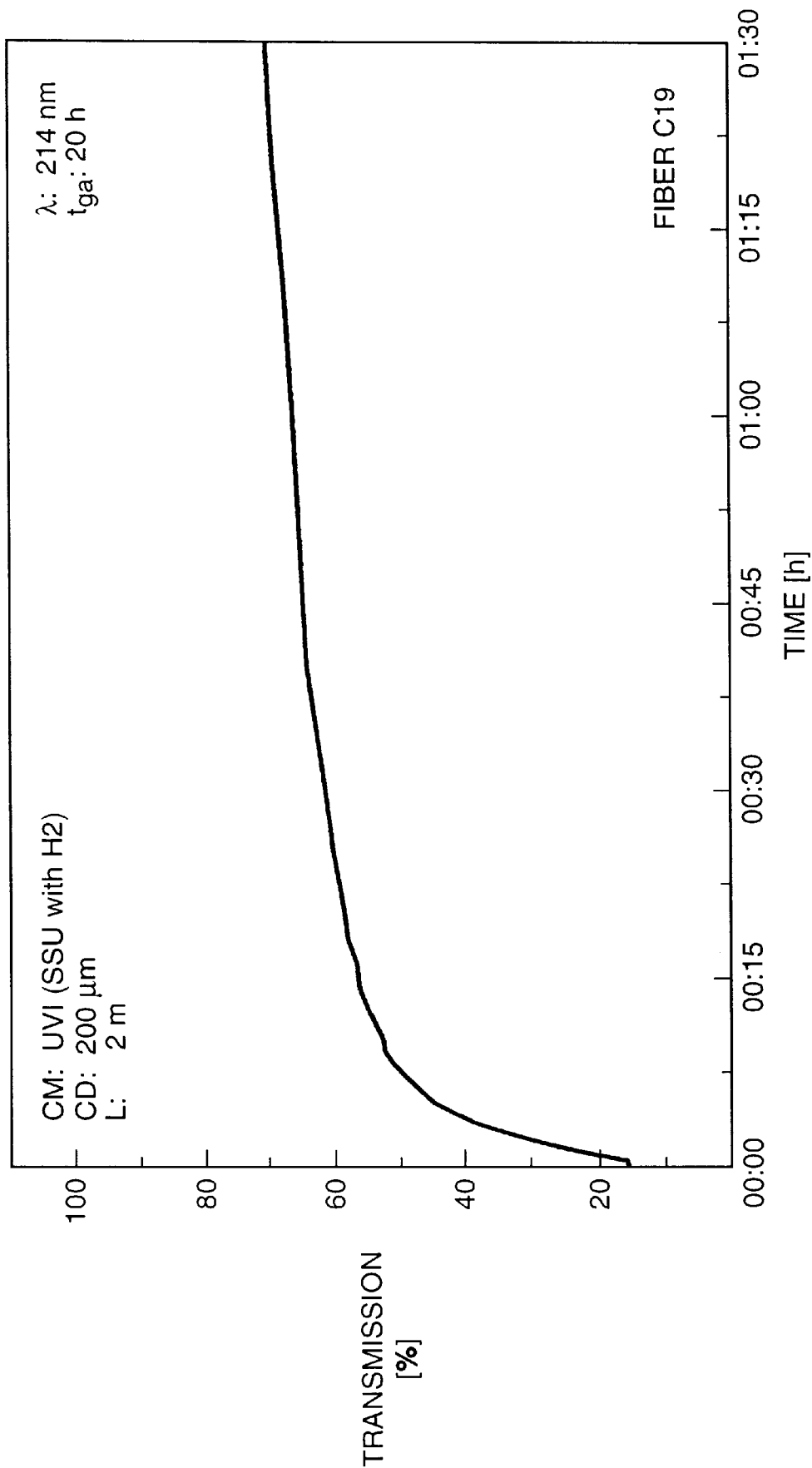
FIG. 9: same as FIG. 8, but the time-dependence of E-center at 215 nm (maximum) during UV-annealing.

The hydrogen-content in the order of mole-percent in the fiber is much higher than the defect concentration generated by gamma- and UV-irradiation; therefore, most of the generated defects will be passivated by hydrogen. However, as shown in the experiments for the first time in the UV-region, the transmission is increasing during transmission of UV-light (FIG. 8). At 214 nm, the UV-transmission value of a gamma-sterilized fiber which is a 2 m long UVI-fiber starts at approximately 5% and ends above approximately 70% of the transmission value before gamma-irradiation (FIG. 9).

Figure 10:
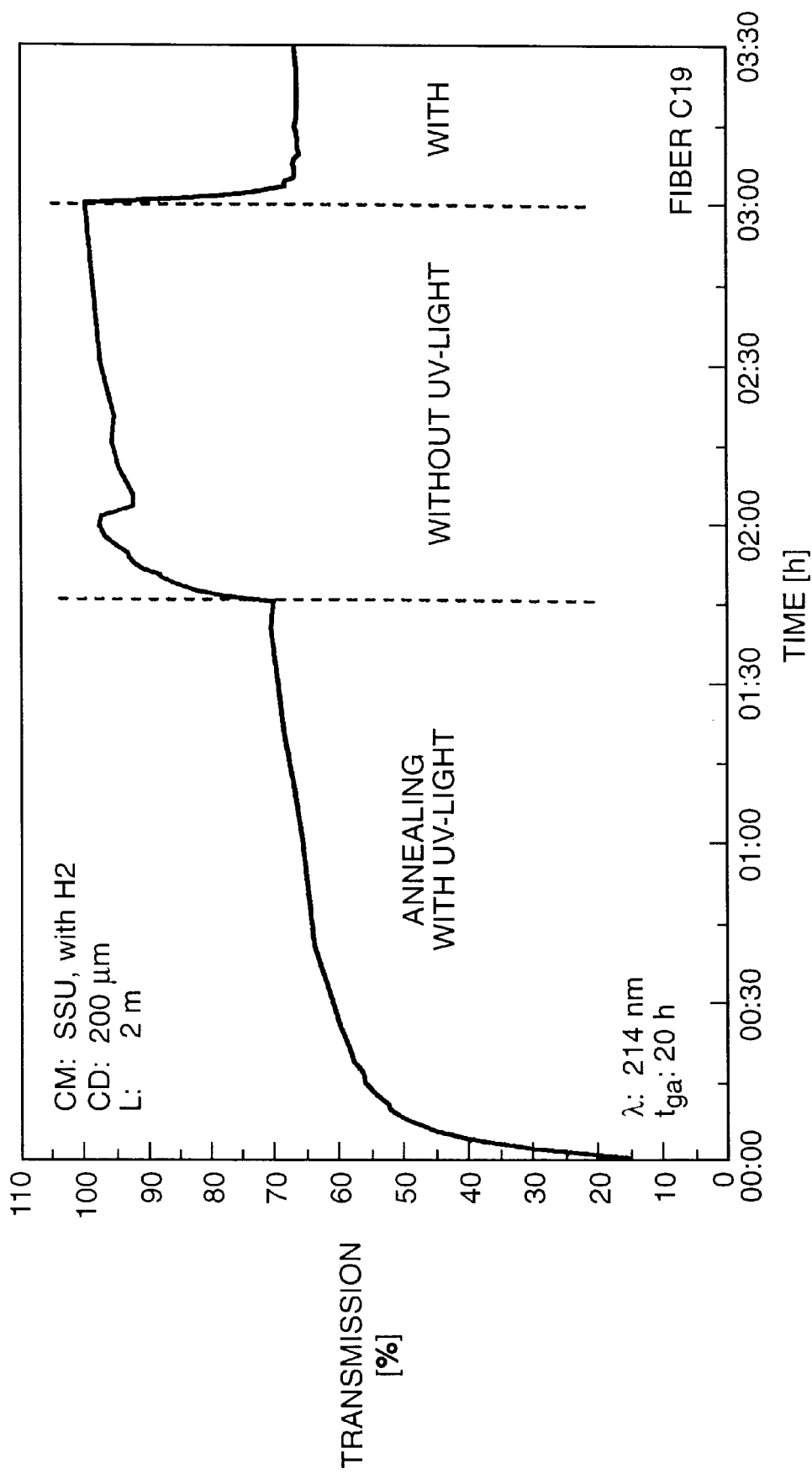
FIG. 10: same as FIG. 9, including modulated UV-light after first saturation to separate gamma-induced stable defects and transient UV-induced defects.
Figure 11:
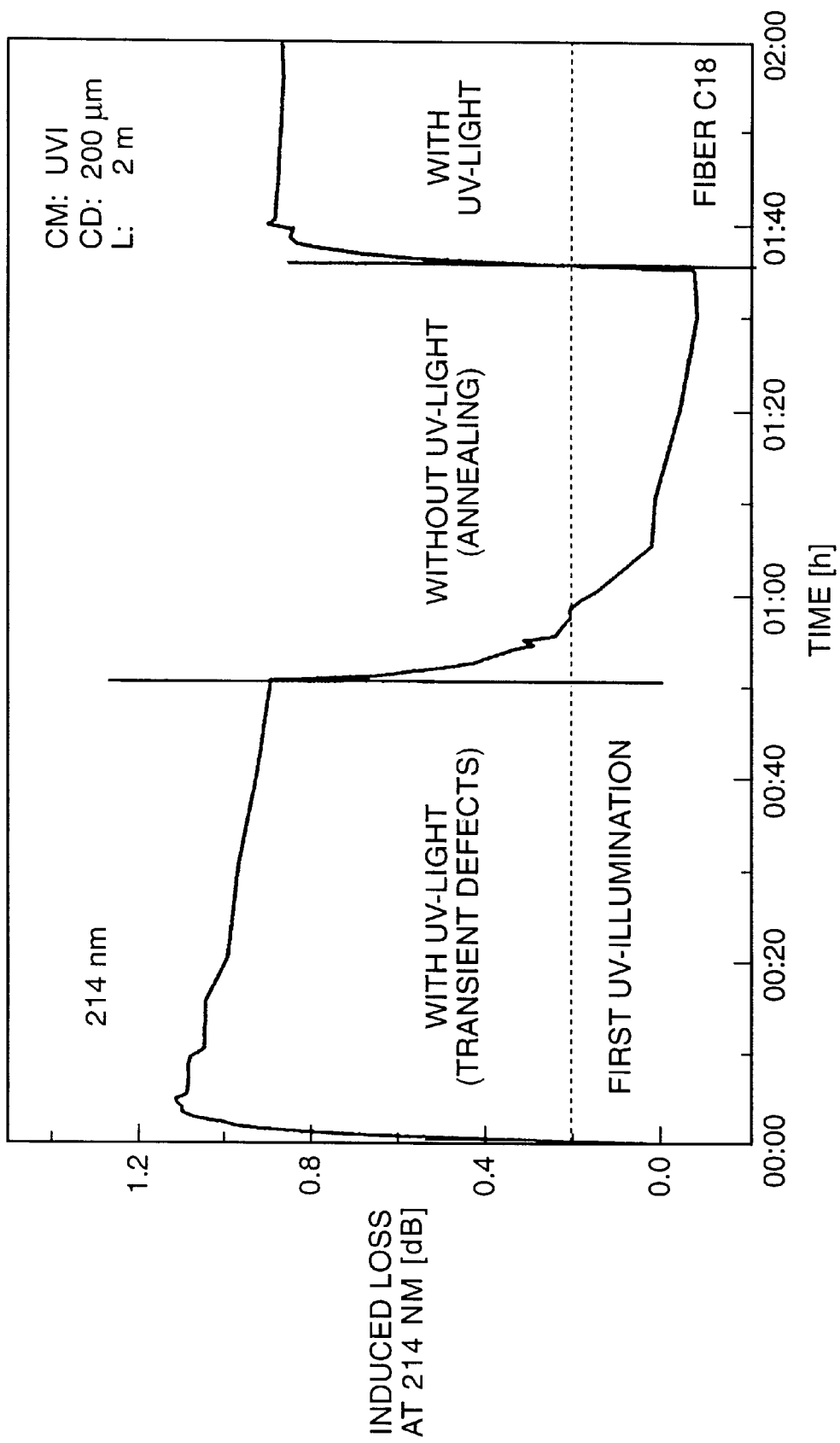
FIG. 11: UV-induced transient defects in new fiber loaded with hydrogen.
Figure 12:
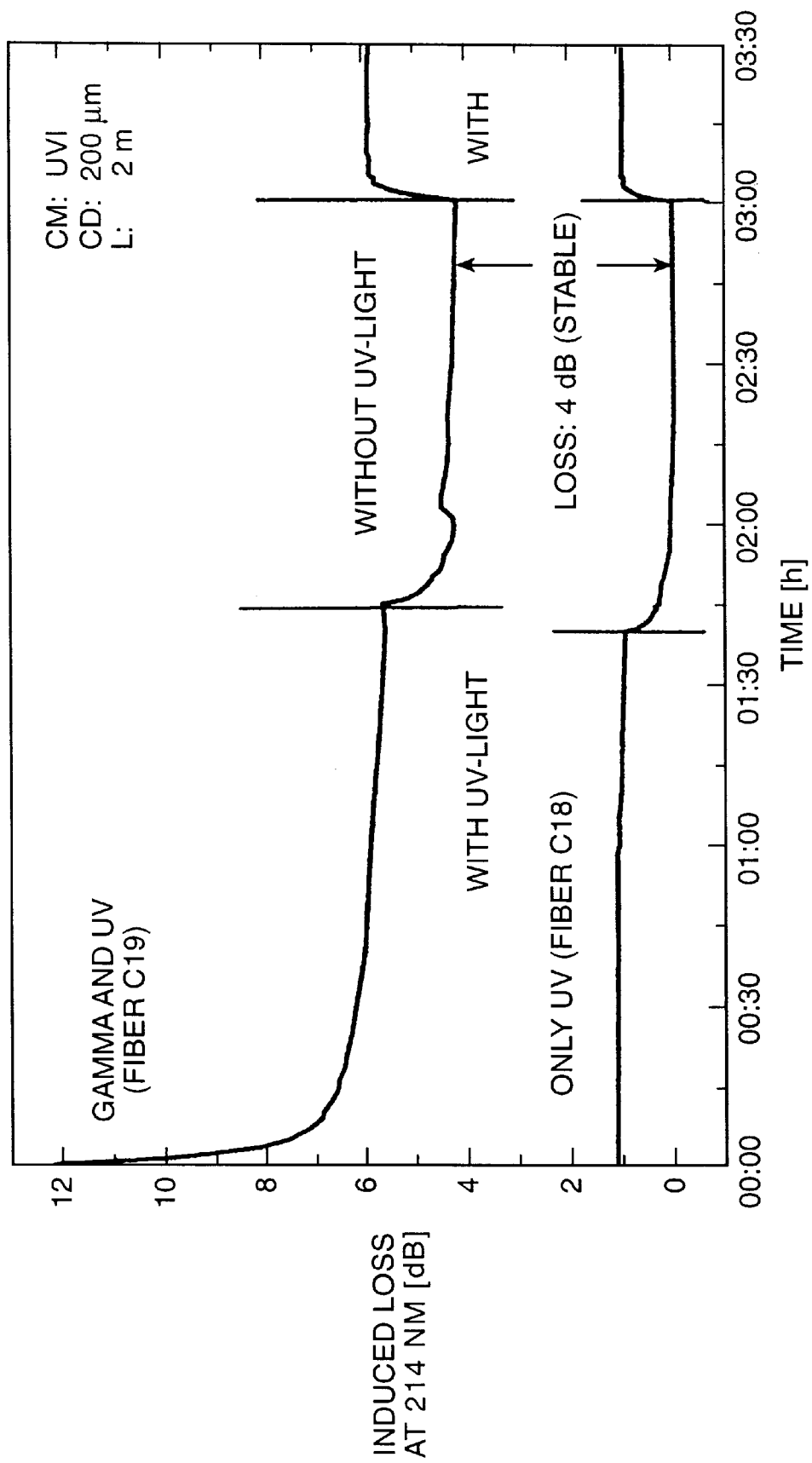
FIG. 12: Comparison of UV-induced and gamma-induced losses in the UV-region with modulated UV-light.

Only together with UV-light and hydrogen the absorbing defects will be annealed in a first step, as shown in FIG. 10 (transmission diagram). In addition, some transient defects will be annealed in the case of additional darkness (no UV-light), well known for UV-light transmission: these transient defects are shown in FIG. 11 (loss diagram). The transient defect recombination after UV-damage and gamma-damage with additional UV-annealing is shown in the common loss diagram (FIG. 12). However, it is shown that a residual attenuation of approximately 2 dB/m at 214 nm exists after gamma-irradiation in the center of E'-center. This means that above 240 nm the induced attenuation is negligible. So, KrF- and XeCl-lasers or fourth harmonic Nd-YAG-lasers will not be influenced.

Figure 13:
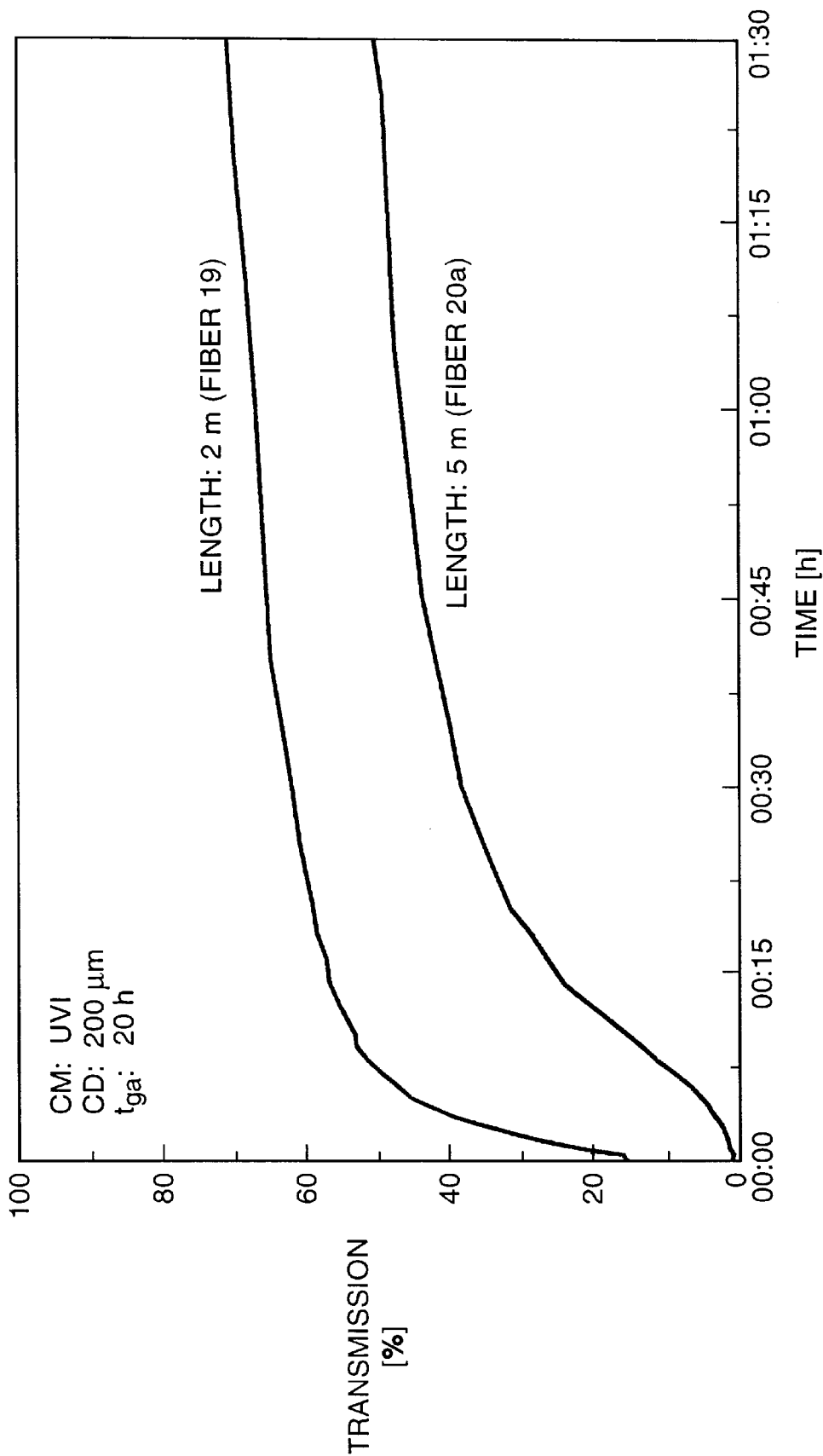
FIG. 13: Influence of fiber length on the annealing process; the penetration of UV-light through the fiber due to annealing becomes obvious.

This performance has been demonstrated with different fiber diameters drawn from the same preform using a broadband deuterium-lamp (FIGS. 6, 7, 8, 9, 10 and 13) and excimer-lasers at 193, 248 and 308 nm. Due to the light power decrease in the fiber due to basic and induced losses, the first-step annealing due to UV-light is strongly length-dependent. Using a fiber length less than 2 m, the transmission increases immediately when the UV-light is transmitted. After approximately 0.5 h a saturation level is obvious (FIG. 13); however, during additional darkness the transmission increases due to transient defects comparable to the UV-damage as demonstrated (FIG. 12). With increasing fiber length (e.g. 5 m), the starting transmission is less than 2%. Therefore, the UV-light is strongly decreasing along the fiber, at the beginning of UV-annealing, and the recovery/ annealing rate is length- and time-dependent. This leads to a delay of transmission increase, as shown in FIG. 13.

Besides the broadband deuterium-lamp as an UV-source, UV-lasers can also be used for annealing. Especially for laser delivery systems, using excimer-laser (especially 248 nm) or a tunable Uv-laser in the range from 206 to 250 nm (frequency-doubled dye laser) /Klein5/, a laser pretreatment is recommended, before the first start of the system. In our opinion, it is practical and sufficient to anneal the defects with the first 500 to 1000 pulses using a high power pulsed laser or within 5 min. using a cw-laser below 280 nm wavelength, before the first use.

In addition, the described axial UV-annealing is also possible in very long fibers (>100 m), with or without a hydrogen-barrier, using two-photon absorption with cw or pulsed UV-lasers above 300 nm having a much longer penetration length due to missing UV-defects and reduced basic attenuation. The same behavior is possible with the light of broadband UV-lamps (e.g. krypton-lamps with high pressure and high spectral DUV-power density) which can be coupled efficiently into the fibers at both sides of the fibers. For thick-core fibers without a hydrogen-barrier, another UV annealing method is possible. Using radial UV-irradiation with excimer-lamps with incoherent light, a fiber with lengths longer than 100 m can be easily annealed, after gamma- or X-ray treatment.

In the case of non-hermetic coated fibers, e.g. the barrier is not needed in thick-core fibers, reloading with hydrogen is possible. It was shown, similar to the first defect passivation, that hydrogen will do the same again. This is important for applications, in which the aluminum is not allowed. Complex fiber bundles or fiber-based components can be recycled, at reduced costs.

Additionally to UV-annealing, we were able to show that the UV-defects after gamma treatment (e.g. gamma sterilization) are less stable at higher temperature than room temperature: the stable E'-centers can recombine due to higher internal energy due to heat-treatment, above 100° C. within 2 hours. Therefore, the hydrogen barrier is necessary especially for thin fibers, having a lifetime for UV-resistance under UV-irradiation of less than 2 weeks at room temperature without the aluminum barrier.

In summary, the damage in unloaded fibers is so strong that annealing is not possible. Thus, hydrogen is the key parameter: first, most of the generated E'-defects can be passivated by hydrogen and second, transportation of UV-light is possible for starting an additional annealing or recombination of more stable defects in the fiber which need hydrogen and parallel UV-light for this process.

It is shown that UV-defect generation in standard UV-fibers is increasing with decreasing fiber diameter. With an optimized drawing process and a sufficient hydrogen-content in the fiber, the UV-damage is nearly diameter-independent which is important for applications with fiber bundles and thin core fibers.

As described, hydrogen diffuses out of the light-guiding fiber core without using a hermetic coating of the invention. In the case of damage due to E'-center generation with UV-light, the weak bonds are passivated with hydrogen. It was tested that the diffusion coefficient is slightly lower in comparison to unloaded defect-free silica. Therefore in non-hermetic sealed and loaded UVI-fibers, the fiber attenuation is lower in comparison to a stored fiber under same conditions. In the case of stable defects, generated by breaking strong SiO-bonds with gamma-radiation, the passivation process is possible, too. In this case, the activity energy for breaking the SiH-bond to become non-bonded hydrogen is higher. Therefore, the UV-attenuation of a hydrogen- and gamma-treated fiber is lower after outgasing in comparison to unloaded only gamma-treated fiber.

On the other hand, it is known that compaction is important for bulk silica glass, during gamma-irradiation. However, in our case a small increase of refractive index takes place in undoped and fluorine doped silica. Therefore, the numerical aperture is nearly the same, before and after gamma-treatment.

Figure 14:
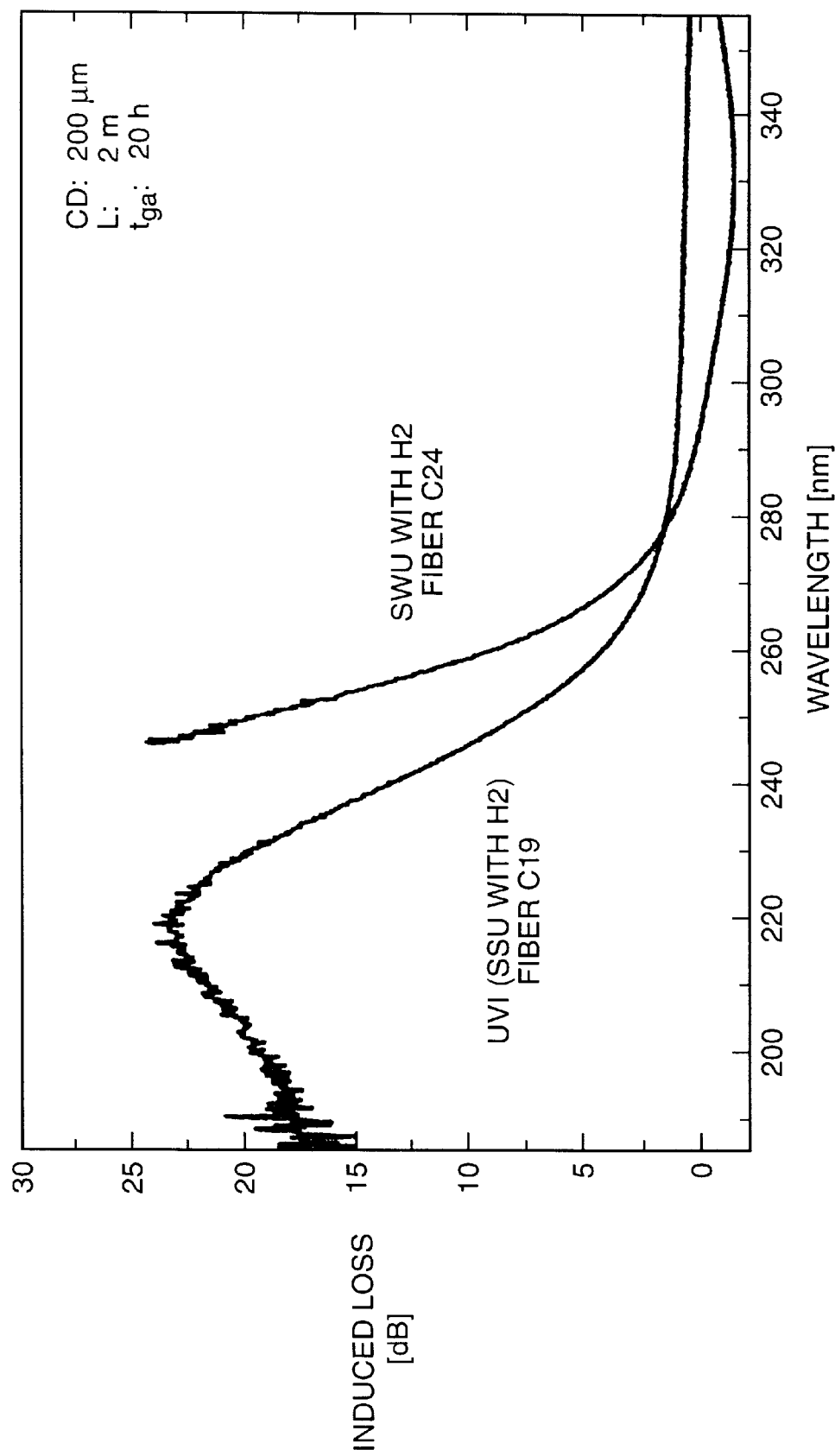
FIG. 14: Comparison of high- and low-OH fibers loaded with hydrogen.

Another surprising results is that low-OH undoped silica core fibers, known as significantly less resistant against UV-light and ionizing radiation like gamma rays or X rays, show a significant improvement in UV-transmission after hydrogen-loading and a significant reduction of defects during and after gamma-irradiation in comparison to unloaded fibers. However, with the commercially available core material the gamma induced attenuation is approximately twice as high in low-OH material (FIG. 14). But at around 330 nm, the gamma-irradiation with hydrogen leads to a reduction of existing defects which appears to be related to chlorine content (Khalilov). Similar to high-OH core material, the defects are annealed during an additional post-treatment with UV light. Low-OH core material may also be useful for this application. Therefore again, after UV-annealing, the UV-transmission is nearly the same.

This is a very important effect for radiation-hard multimode- and singlemode-fibers in the wavelength region above 1.0 μm, in which the extrinsic OH-absorption bands have a higher value than the basic spectral attenuation of silica due to Rayleigh scattering; additionally, the use of deuterium molecules are better for these applications because the absorption bands of molecular deuterium are shifted to higher wavelength in comparison to molecular hydrogen.

For singlemode-UV laser, a UV-singlemode fiber is necessary in order to keep the optimal Gaussian beam profile and parameter the same during propagation through the delivery system. Because the core diameter is approximately less than 5 μm, a feedback loop system is recommended. Also in this case, the UV-transmission of hydrogen loaded and gamma-irradiated UV-fibers are much more stable because the gamma induced losses are significantly reduced.

The hydrogen depletion has to be taken into account at the fiber end face, because the hermetic sealing is in a radial direction. Using a high power cw UV-laser, we have demonstrated the outgasing through the fiber end faces since, within two days, a red fluorescence has been seen in a small segment of the fiber, located at the input side. Therefore, a UV-transparent hydrogen-barrier based on oxides, such as $M_2O_3$, is recommended on the end face of the fiber. The same mechanism is expected by the oxides, because a barrier layer with similar content and thickness in the order of tens of nanometers will be created. Although the diffusion coefficient may be smaller in comparison to the radial barrier due to the different production steps, we expect at least one magnitude of order lower diffusion-coefficient in comparison to silica itself. On the other hand, the UV-absorption of the thin layer on the end face can be neglected, because the UV transmission of the $Al_2O_3$- or other suitable oxide-layers is good.

With these two layers, around the fiber and at the fiber end faces, thermal treatment, described above, instead of UV-annealing is easier and more efficient because higher temperatures can be used without significant hydrogen losses in this process steps.

With these fibers, either single- or multimode-type, new fiber-optic based delivery systems are possible or in VIS/IR-region already existing fiber-optic based systems can be modified for the UV-region. For example, UV-laser or UV-lamp light treatment in adverse environments, such as in the presence of ionizing radiation like gamma rays, X-rays or high energy particles, can be carried out in a controlled volume given by the fiber diameter and the image system used. This treatment can be used for stimulation of chemical reactions from vapor phase (CVD-methods) or in liquids; if the reaction products are solid, they can be deposited in a controlled area. Or, smoothing/hardening of material surfaces due to controlled melting is possible with this method. In addition, new studies in the field of high energy physics (radiation or particles) are possible because the fiber can be used for UV-light transportation to the process (active light) or to analyze the process by observation of UV-light. The interaction of UV-light and high-energy particles is interesting in this case. Because the fiber bundles can be manufactured as coherent bundles, UV-images in these adverse environments will be feasible for process analyzing and later for process controlling. Adverse environments means in our case the circumstances with ionizing radiation, such as gamma-rays and X-rays or high-energy particles generating damaging light.

In addition, using singlemode-fibers for high bit rate communication, the system can be used in high-temperature under adverse environmental conditions as well. The wavelength may be in the visible or in the IR-region, too, if the distance is too long.

Figure 15:
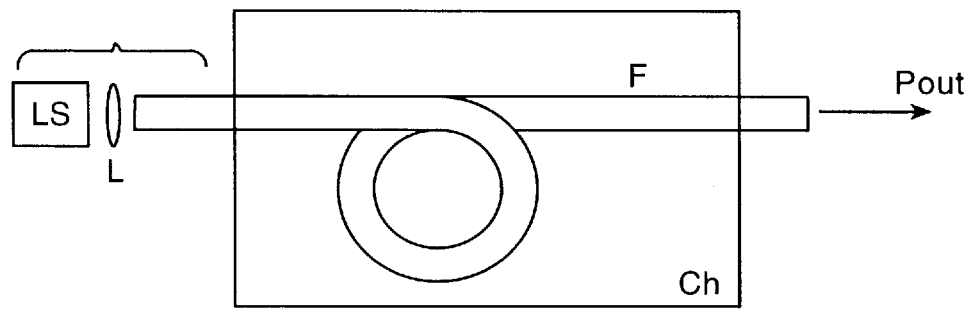
FIG. 15: Schematic illustration of a delivery system.
Figure 16:
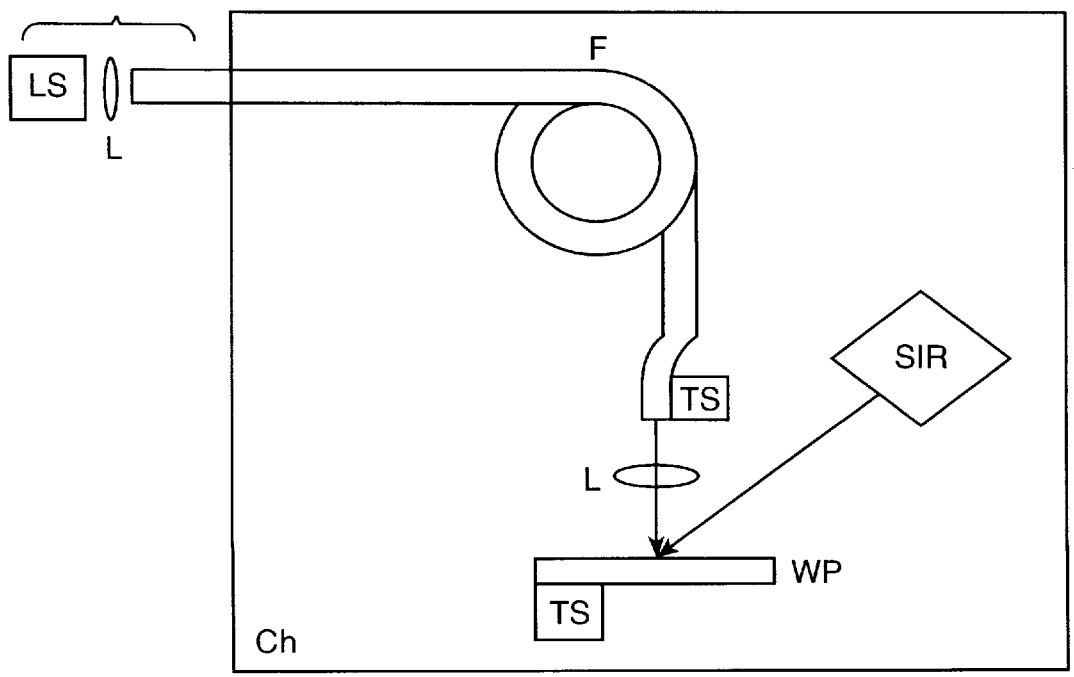
FIG. 16: Schematic illustration of apparatus including a delivery system.

A delivery system of the invention is illustrated in FIG. 15. in which optical fiber 2 is located in chamber 4 in which ionizing radiation is present. A light source 6 which may include a laser source is directed along the length of fiber 2. A lens 8 is disposed between light source 6 and fiber 2. The output power exits from fiber 2. Apparatus including a delivery system is shown in FIG. 16. Translation stages 10 are disposed at the exit end of optical fiber 2 and adjacent the workpiece. The output power leaves fiber 2 through an optional lens 12 before striking the workpiece and a source of ionizing radiation is directed onto the workpiece coincident with the power output from the optical fiber.

While the invention has been described above with respect to certain embodiments thereof, it will be appreciated that variations and modifications may be made without departing from the spirit and scope of the invention.

What is claimed is:

1. An optical fiber for UV light transmission, the fiber being sterilized with gamma radiation, comprising:
   a multimode optical fiber having:
      a core comprising synthetic silica that is optionally doped with less than 1% fluorine;
      a cladding comprising fluorine-doped or boron fluorine-doped synthetic silica;
      a hydrogen content in the optical fiber higher than $5 \times 10^{19}$ molecules/cm$^3$; and
      a coating on the optical fiber comprising a metal selected from the group consisting of aluminum, copper, zinc, tin, silver and gold, for suppressing hydrogen diffusion outwardly from the fiber, said coating having a high diffusion coefficient below 150° C. and a low diffusion coefficient at a hydrogen loading temperature above 250° C.;
      wherein the coated optical fiber is sterilized with gamma radiation.

2. An optical fiber according to claim 1, wherein the metal is aluminum.

3. An optical fiber according to claim 1, wherein the hydrogen content is higher than $2 \times 10^{20}$ molecules/cm$^3$.

4. An optical fiber according to claim 1, having a silica core with high-OH content above 50 ppm.

5. An optical fiber according to claim 1, having a silica core with a high-OH content of 50–1500 ppm.

6. An optical fiber according to claim 1, having a silica core or a slightly fluorine-doped core with low-OH content below 50 ppm after treatment with hydrogen and sterilizing with gamma radiation.

7. An optical fiber according to claim 1, having a silica core or a slightly fluorine doped core with a low-OH content below 20 ppm after treatment with hydrogen and sterilizing with gamma radiation.

8. An optical fiber according to claim 1, having a silica core or a slightly fluorine doped core with low-OH content below 20 ppm before treatment with hydrogen and sterilizing with gamma radiation.

9. An optical fiber according to claim 1, comprising a coating of metal oxide on at least one end surface thereof.

10. An optical fiber according to claim 1, having a low-OH content below 5 ppm before treatment with hydrogen and sterilizing with gamma radiation.

11. A sterilized multimode fiber bundle comprising a plurality of optical fibers according to claim 1.

12. A sterilized multimode fiber bundle comprising a plurality of optical fibers according to claim 9.

13. A sterilized catheter comprising at least one optical fiber according to claim 1.

14. A sterilized catheter comprising at least one fiber bundle according to claim 11.

15. A process for producing gamma sterilized optical fibers comprising:
   manufacturing a preform having a core comprising synthetic silica that is optionally doped with less than 1% fluorine and a cladding comprising fluorine doped or boron-fluorine doped synthetic silica;
   drawing the preform into a fiber;
   annealing the fiber for reducing drawing-induced UV defects;
   coating the fiber with a metal selected from the group consisting of aluminum, copper, zinc, tin, silver and gold, for suppressing hydrogen outgasing from the fiber, said coating having a high diffusion coefficient below 150° and a low diffusion coefficient at a hydrogen loading temperature above 250° C.; and thereby obtaining a coated optical fiber from which migration of hydrogen is substantially suppressed below 150° C.; and
   sterilizing the coated optical fiber with gamma radiation.

16. A process according to claim 15, further comprising:
   processing the coated fiber at a temperature above 250° C. in a hydrogen atmosphere above 20 atmospheres pressure, whereby hydrogen migrates through the coating into the fiber; and
   cooling the coated fiber.

17. A process according to claim 16, wherein the hydrogen atmosphere is at a pressure above 150 atmospheres wherein the processing is at a temperature above 250° C.

18. A process according to claim 15, further comprising irradiating the fiber with about 0.5–5 Mrad total dose of gamma radiation, thereby sterilizing the fiber.

19. A process according to claim 18, wherein the total dose of gamma radiation is about 2 Mrad.

20. A process according to claim 15, further comprising UV annealing along the axis of the fiber with a UV source.

21. A process according to claim 20, wherein the UV source is a member selected from the group consisting of a UV laser irradiating below 350 nm and a broadband deuterium lamp.

22. A process according to claim 18, further comprising UV annealing with side illumination after the gamma irradiating.

23. A process according to claim 22, wherein the UV source is a member selected from the group consisting of a UV laser irradiating below 350 nm, a broadband deuterium lamp, an excimer laser lamp and a high pressure mercury lamp.

24. A process according to claim 18, further comprising annealing using heat.

25. A delivery system comprising sterilized fibers according to claim 1 for transportation of UV radiation, wherein the UV radiation is produced by a broadband low power UV source or by high power continuous or pulsed UV lasers.

26. A delivery system comprising a sterilized fiber bundle according to claim 7 for transportation of UV radiation, wherein the UV radiation is produced by a broadband low power UV source or by high power continuous or pulsed UV lasers.

27. A delivery system according to claim 25, wherein the fibers are selected from the group consisting of high-OH core material and the UV source is a member selected from the group consisting of a UV laser irradiating below 350 nm and a broadband deuterium lamp.

28. A delivery system comprising gamma radiation sterilized multimode fibers according to claim 1 for light transportation in the ultraviolet, visible or infra-red regions under ionizing radiation.

29. A delivery system comprising at least one optical fiber according to claim 1 and selected from the group consisting of singlemode fibers and multimode fibers for light transportation in the ultraviolet, visible or infrared regions under ionizing radiation comprising a member selected from the group consisting of gamma radiation, X-rays and high energy particles.

30. A delivery system according to claim 29, wherein at least one fiber has not been sterilized.

31. A delivery system according to claim 29, wherein the light being transported has a wavelength between 200 nm and 1700 nm.

32. A delivery system according to claim 29, wherein the region of light transmission is up to 2.2 $\mu$m and the fiber is loaded with deuterium, under ionizing radiation.

33. A delivery system according to claim 29, wherein the light being transported is produced by a laser light source.

34. Apparatus for transporting light in the ultraviolet, visible or infrared regions comprising a delivery system according to claim 29.

* * * * *